United States Patent
Yamashita et al.

(10) Patent No.: US 9,551,572 B2
(45) Date of Patent: Jan. 24, 2017

(54) SENSOR DEVICE, ANALYZING DEVICE, AND RECORDING MEDIUM FOR DETECTING THE POSITION AT WHICH AN OBJECT TOUCHES ANOTHER OBJECT

(71) Applicant: SONY CORPORATION, Minato-ku (JP)

(72) Inventors: Kosei Yamashita, Kanagawa (JP); Hideyuki Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 183 days.

(21) Appl. No.: 14/344,160

(22) PCT Filed: Oct. 23, 2012

(86) PCT No.: PCT/JP2012/077316
§ 371 (c)(1),
(2) Date: Mar. 11, 2014

(87) PCT Pub. No.: WO2013/069447
PCT Pub. Date: May 16, 2013

(65) Prior Publication Data
US 2014/0290332 A1    Oct. 2, 2014

(30) Foreign Application Priority Data
Nov. 8, 2011   (JP) ................. 2011-244345

(51) Int. Cl.
*G01M 7/02*   (2006.01)
*G01B 17/00*  (2006.01)
(Continued)

(52) U.S. Cl.
CPC .......... *G01B 17/00* (2013.01); *A63B 71/0669* (2013.01); *G01H 1/00* (2013.01); *G01H 11/08* (2013.01);
(Continued)

(58) Field of Classification Search
USPC ............ 73/11.01, 12.01, 12.02, 12.04, 12.05
See application file for complete search history.

(56) References Cited

U.S. PATENT DOCUMENTS

| 4,257,594 A | 3/1981 | Conrey et al. |
| 4,822,042 A | 4/1989 | Landsman |
(Continued)

FOREIGN PATENT DOCUMENTS

| AU | 2004282826 | 4/2005 |
| AU | 2009219320 A1 | 9/2009 |
(Continued)

OTHER PUBLICATIONS

Combined Chinese Office Action and Search Report issued Sep. 1, 2015 in Patent Application No. 201280053440.2 (with English language translation).

(Continued)

*Primary Examiner* — Eric S McCall
(74) *Attorney, Agent, or Firm* — Oblon, McClelland, Maier & Neustadt, L.L.P.

(57) ABSTRACT

Provided is a sensor device including a sensor configured to output a vibration datum by detecting a change in a state of a vibration in a first object when a second object touches the first object, a holding section configured to hold, at a portion of the first object which is different from a portion where the second object touches, the sensor in a state where the vibration in the first object is transmitted, and a communication section configured to transmit the single vibration datum detected by the sensor to an analyzing device which identifies a touch position where the second object touches the first object by analyzing the vibration datum.

20 Claims, 26 Drawing Sheets

(51) Int. Cl.
*A63B 71/06* (2006.01)
*G09B 19/00* (2006.01)
*G01H 1/00* (2006.01)
*G06F 3/043* (2006.01)
*G01H 11/08* (2006.01)
*A63B 69/36* (2006.01)
*A63B 69/38* (2006.01)
*A63B 24/00* (2006.01)
*A63B 69/00* (2006.01)
*G06K 9/00* (2006.01)

(52) U.S. Cl.
CPC ........... *G06F 3/043* (2013.01); *G09B 19/0038* (2013.01); *A63B 69/0002* (2013.01); *A63B 69/0017* (2013.01); *A63B 69/36* (2013.01); *A63B 69/38* (2013.01); *A63B 2024/0043* (2013.01); *A63B 2069/0008* (2013.01); *A63B 2102/16* (2015.10); *A63B 2220/10* (2013.01); *A63B 2220/64* (2013.01); *A63B 2220/833* (2013.01); *A63B 2225/50* (2013.01); *G06K 9/0053* (2013.01)

(56) References Cited

U.S. PATENT DOCUMENTS

| | | | |
|---|---|---|---|
| 4,870,868 A | 10/1989 | Gastgeb et al. | |
| 5,709,610 A | 1/1998 | Ognjanovic | |
| 6,248,021 B1 | 6/2001 | Ognjanovic | |
| 7,789,742 B1 | 9/2010 | Murdock et al. | |
| 2003/0148836 A1 | 8/2003 | Falone et al. | |
| 2005/0061076 A1 | 3/2005 | Kim | |
| 2005/0075846 A1 | 4/2005 | Kim | |
| 2005/0078093 A1 | 4/2005 | Peterson, Jr. et al. | |
| 2006/0179949 A1 | 8/2006 | Kim | |
| 2006/0260402 A1 | 11/2006 | Kim | |
| 2006/0268263 A1 | 11/2006 | Kim | |
| 2007/0006653 A1 | 1/2007 | Kim | |
| 2007/0105664 A1 | 5/2007 | Scheinert et al. | |
| 2007/0260425 A1 | 11/2007 | Kim | |
| 2007/0260427 A1 | 11/2007 | Kim | |
| 2007/0265806 A1 | 11/2007 | Kim | |
| 2007/0265808 A1 | 11/2007 | Kim | |
| 2008/0011086 A1 | 1/2008 | Kim | |
| 2009/0131196 A1 | 5/2009 | Werner et al. | |
| 2009/0221388 A1 | 9/2009 | Giannetti et al. | |
| 2009/0303009 A1 | 12/2009 | Itasaki et al. | |
| 2010/0024031 A1 | 1/2010 | Shribman et al. | |
| 2010/0093463 A1 | 4/2010 | Davenport et al. | |
| 2010/0198528 A1 | 8/2010 | McCauley | |
| 2010/0304877 A1 | 12/2010 | Iwahashi et al. | |
| 2011/0021280 A1 | 1/2011 | Boroda et al. | |
| 2011/0081978 A1 | 4/2011 | Murdock et al. | |
| 2011/0082571 A1 | 4/2011 | Murdock et al. | |
| 2011/0087344 A1 | 4/2011 | Murdock et al. | |
| 2011/0092260 A1 | 4/2011 | Murdock et al. | |
| 2011/0130223 A1 | 6/2011 | Murdock et al. | |
| 2011/0151977 A1 | 6/2011 | Murdock et al. | |
| 2011/0212757 A1 | 9/2011 | Murdock et al. | |
| 2011/0281621 A1 | 11/2011 | Murdock et al. | |
| 2012/0157241 A1* | 6/2012 | Nomura | A63B 69/0002 473/422 |
| 2013/0127866 A1* | 5/2013 | Yamamoto | G06T 11/206 345/440 |
| 2015/0120021 A1* | 4/2015 | Kerhuel | A63B 69/38 700/91 |
| 2015/0141175 A1* | 5/2015 | Pisupati | G06Q 10/0639 473/461 |
| 2015/0157901 A1* | 6/2015 | Mace | A63B 24/0003 473/549 |
| 2015/0238813 A1* | 8/2015 | Saiki | G06K 9/00342 702/141 |
| 2015/0306469 A1* | 10/2015 | Savelli | A63B 69/38 473/524 |
| 2016/0074703 A1* | 3/2016 | Shibuya | A63B 5/11 473/223 |
| 2016/0243401 A1* | 8/2016 | Matsunaga | G01L 5/042 |
| 2016/0253553 A1* | 9/2016 | Watanabe | G09B 19/0038 |

FOREIGN PATENT DOCUMENTS

| | | |
|---|---|---|
| CN | 1848043 A | 10/2006 |
| CN | 101864125 A | 10/2010 |
| CN | 101873879 A | 10/2010 |
| CN | 101965214 A | 2/2011 |
| EP | 1695199 | 8/2006 |
| JP | 59-91974 A | 5/1984 |
| JP | 59-194761 A | 11/1984 |
| JP | 3-501215 A | 3/1991 |
| JP | 11-47338 A | 2/1999 |
| JP | 11-271183 | 10/1999 |
| JP | 2000-500229 A | 1/2000 |
| JP | 2006-323589 A | 11/2006 |
| JP | 2009-295002 | 12/2009 |
| JP | 2010-63863 A | 3/2010 |
| JP | 2010-244253 A | 10/2010 |
| JP | 2011-512952 A | 4/2011 |
| JP | 2011-187076 | 9/2011 |
| JP | 2012-130415 A | 7/2012 |
| JP | 5426397 B2 | 2/2014 |
| JP | 5664240 B2 | 2/2015 |
| KR | 10-2006-0135628 | 12/2006 |
| KR | 10-2010-0088152 A | 8/2010 |
| WO | WO 89/01808 A1 | 3/1989 |
| WO | WO 2005/038639 A2 | 4/2005 |
| WO | WO 2009/069698 A1 | 6/2009 |
| WO | WO 2009/108708 A2 | 9/2009 |
| WO | WO 2010/024031 A1 | 3/2010 |
| WO | WO 2011/036567 A2 | 3/2011 |
| WO | WO 2012/075197 A2 | 6/2012 |

OTHER PUBLICATIONS

Extended European Search Report issued Oct. 26, 2015 in Patent Application No. 12847489.7.
International Search Report issued Jan. 29, 2013 in PCT/JP2012/077316.
Office Action issued Dec. 22, 2015 in Japanese Patent Application No. 2013-542913 (with English language translation).
Office Action issued Jul. 26, 2016 in Japanese Patent Application No. 2013-542913 (with English-language Translation).
Jun Odate, et al., "A Research of Vibration Characteristics and Structural Optimization for Tennis Racket with Modal Analysis", vol. 72, No. 718, Jun. 2006, 9 pages (with Cover Page and English Abstract).

\* cited by examiner

FIG.10
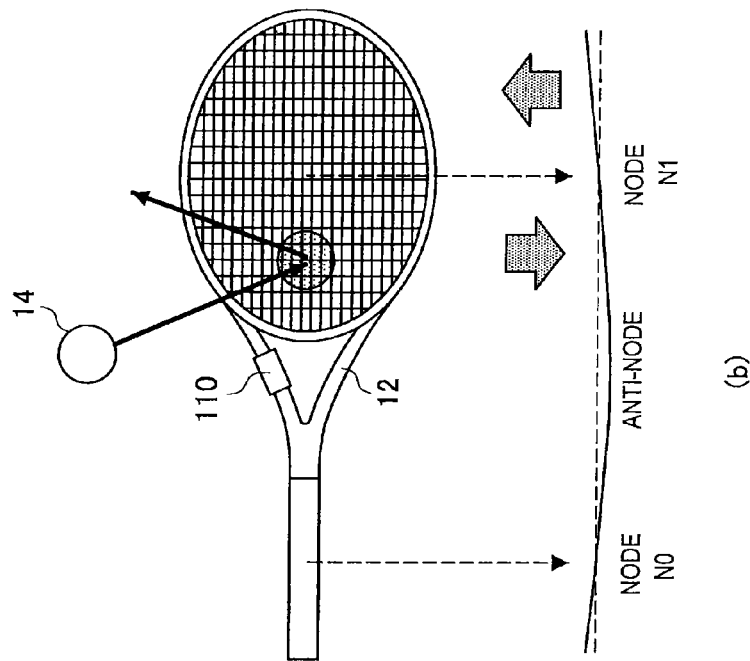
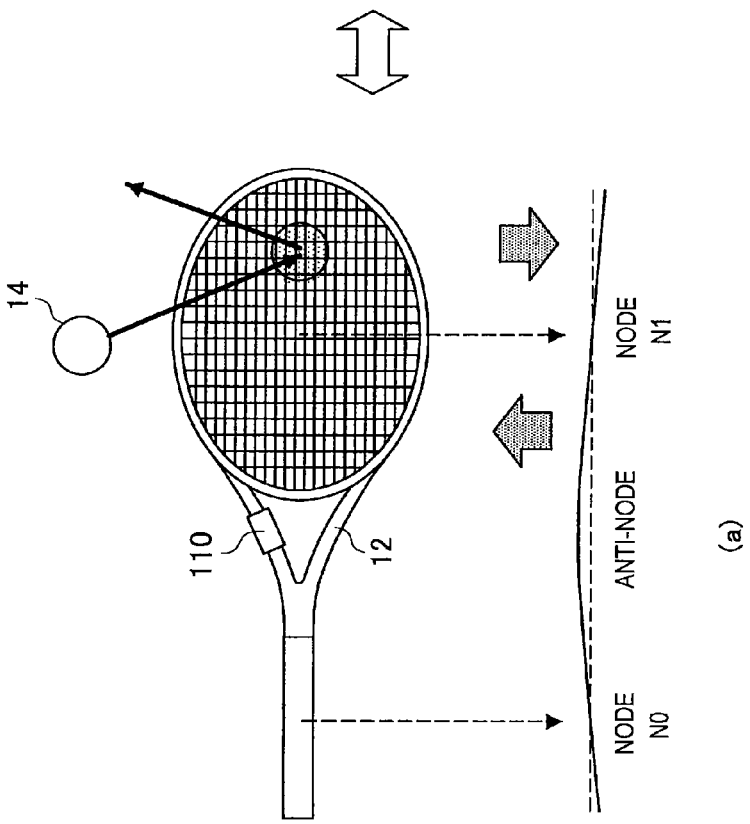

FIG.14

| RANK | SAMPLE |
|------|--------|
| 1 | 37-3 |
| 2 | 37-5 |
| 3 | 41-2 |
| 4 | 37-1 |
| 5 | 49-3 |
| 6 | 36-2 |
| 7 | 37-8 |

SENSOR DEVICE, ANALYZING DEVICE, AND RECORDING MEDIUM FOR DETECTING THE POSITION AT WHICH AN OBJECT TOUCHES ANOTHER OBJECT

TECHNICAL FIELD

The present disclosure relates to a sensor device, an analyzing device, and a recording medium.

BACKGROUND ART

Until now, there has been a lot of development in technology which assists the motion of a user by using sensing and analysis. For example, in sports which strike a ball using a striking tool, such as tennis, badminton, table tennis, golf or baseball, detecting a frequency and position at which a ball is hit by a striking tool, and presenting this frequency and position to a user as information, are such a technology. As an example of such a technology, Patent Literature 1, for example, describes technology which arranges sensors on and around a striking surface of a tennis racket, and notifies to a user the frequency and position by detecting that the ball has hit the striking surface.

CITATION LIST

Patent Literature

Patent Literature 1: JP S59-194761A

SUMMARY OF INVENTION

Technical Problem

In the technology described above in Patent Literature 1, a number of sensors are arranged corresponding to each position on the striking surface of a tennis racket. In this way, it is possible to detect not only the frequency the ball hits the striking surface, but also where on the striking surface the ball has hit. However, it can take a great deal of time for such a number of sensors to be installed by the user on the striking surface after purchase. While a striking tool with a sensor already incorporated may be sold, the price of the striking tool will rise, which would make it difficult for the user to make a replacement purchase of the striking tool. Further, while a method is considered, which photographs the instant a ball collides using a high speed camera capable of photographing at a frame rate of several thousand frames per second and confirms the position the ball has hit from an image, since a high speed camera is expensive and the operation is complex, it will be difficult for the user to easily use it.

Further, the technology disclosed in Patent Literature 1 can be said to be technology that detects the position at which an object (tennis racket) is touched with another object (ball). A touch panel, for example, is well known as such technology in the other fields. A touch panel is also similar to the technology disclosed in Patent Literature 1 in that the position at which an object (screen) is touched with another object (finger) is detected using output from sensors that are arranged to cover the area of a detection target. In such a technology, as the area of the detection target is larger, as many sensors as possible need to be arranged, which makes the configuration of a device more complex.

Here, the present disclosure proposes a new and improved sensor device, analyzing device, and recording medium that can detect the position at which an object touches another object with a simpler configuration.

Solution to Problem

According to an embodiment of the present disclosure, there is provided a sensor device including a sensor configured to output a vibration datum by detecting a change in a state of a vibration in a first object when a second object touches the first object, a holding section configured to hold, at a portion of the first object which is different from a portion where the second object touches, the sensor in a state where the vibration in the first object is transmitted, and a communication section configured to transmit the single vibration datum detected by the sensor to an analyzing device which identifies a touch position where the second object touches the first object by analyzing the vibration datum.

According to an embodiment of the present disclosure, there is provided an analyzing device including a communication section configured to receive a single vibration datum obtained by detection of a change in a state of a vibration in a first object when a second object touches the first object, the detection being performed by a sensor held at a portion of the first object which is different from a portion where the second object touches, in a state where the vibration in the first object is transmitted; and an identification section configured to identify a touch position where the second object touches the first object by comparing a vibration characteristic of the vibration datum and a vibration characteristic for each position of the first object where the second object touches.

According to an embodiment of the present disclosure, there is provided a recording medium having a program recorded thereon, the program causing a computer to execute a function of receiving a single vibration datum obtained by detection of a change in a state of a vibration in a first object when a second object touches the first object, the detection being performed by a sensor held at a portion of the first object which is different from a portion where the second object touches, in a state where the vibration in the first object is transmitted; and a function of identifying a touch position where the second object touches the first object by comparing a vibration characteristic of the vibration datum and a vibration characteristic for each position of the first object where the second object touches.

According to an embodiment of the present disclosure, the position of the first object where the second object touches can be identified by analysis of the single vibration datum acquired by the sensor held at the portion different from the portion where the second object touches the first object. The configuration of the device installed in the first object is simpler, since the sensor is not necessarily included at the touch position.

Advantageous Effects of Invention

According to the above embodiments of the present disclosure, as described above, it is possible to detect the position at which an object touches another object with a simpler configuration.

BRIEF DESCRIPTION OF DRAWINGS

FIG. 10 is a figure for further describing an estimation of a collision position in a first embodiment of the present disclosure.

FIG. 14 is a figure showing a second example of a results display in a first embodiment of the present disclosure.

DESCRIPTION OF EMBODIMENTS

Figure 1:
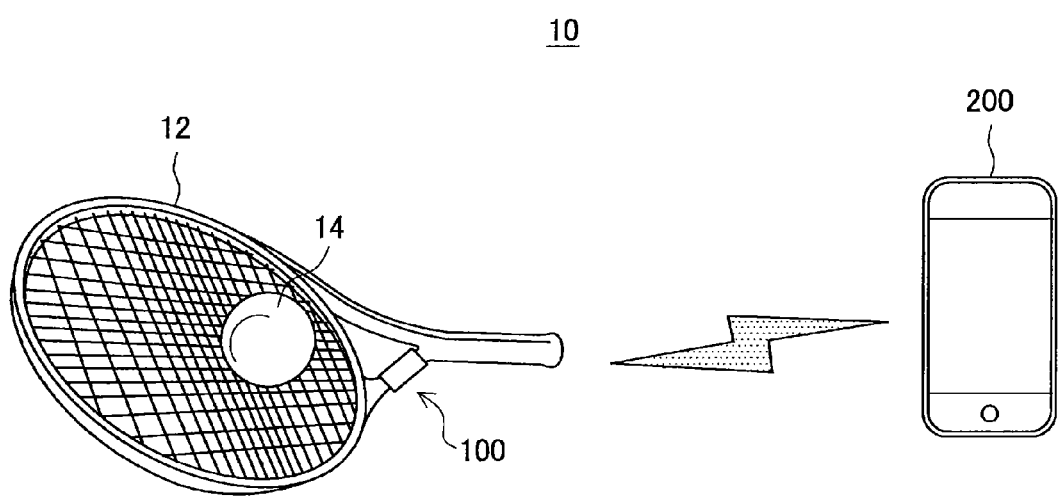
FIG. 1 is a figure showing an entire configuration of a first embodiment of the present disclosure.

Hereinafter, preferred embodiments of the present disclosure will be described in detail with reference to the appended drawings. Note that, in this specification and the drawings, structural elements that have substantially the same function and structure are denoted with the same reference numerals, and repeated explanation thereof is omitted.

Note that the description will be made in the following order.
1. First embodiment
1-1. Entire configuration
1-2. Configuration of the sensor device
1-3. Configuration of the analyzing device
1-4. Theory of collision position identification
1-5. Process example of collision position identification
1-6. Display example of the results
2. Second embodiment
2-1. Entire configuration
2-2. Configuration of the sensor device
2-3. Process example
2-4. Modification example
3. Third embodiment
4. Fourth embodiment
5. Supplement 1. First Embodiment First, a first embodiment of the present disclosure will be described with reference to FIGS. 1 to 14. In this embodiment, sensor devices are mounted on a striking tool used in sports, and an analyzing device identifies the position at which a ball (second object) collides with (touches) the striking tool (first object).

(1-1. Entire Configuration)

First, an entire configuration of the first embodiment of the present disclosure will be described with reference to FIG. 1. FIG. 1 is a figure showing the entire configuration of the first embodiment of the present disclosure.

Referring to FIG. 1, a system 10, which includes a sensor device 100 mounted on a racket 12 and an analyzing device 200 which communicates with the sensor device 100, is provided in the first embodiment of the present disclosure.

Here, the racket 12 is a striking tool for striking a ball 14 in tennis. In the first embodiment hereinafter, while the racket 12 is described as an example of a striking tool (first object), the examples of a striking tool are not limited to this. As described later, in this embodiment, a position on a striking tool which a ball (second object) collides with is identified based on vibrations when the ball collides with the striking tool. Therefore, this embodiment can be applied to a striking tool in which vibrations are generated by the collision of a ball used in a sport, for example, a striking tool used for all types of sports, such as a badminton racket, a table tennis racket, a golf club, or a baseball bat. The hit object (second object) that collides with the striking tool (first object) is not limited to a ball either, and may be a badminton shuttlecock, for example.

The sensor device 100 is mounted on the racket 12, and transmits a detection result to the analyzing device 200 as vibration data, by detecting vibrations when the ball 14 collides with the racket 12. The analyzing device 200 analyzes the vibration data transmitted from the sensor device 100, and identifies the position on the racket 12 which the ball 14 collides with. Note that for simplicity, the position on the racket 12 which the ball 14 collides with will hereinafter be simply called the collision position. Information related to the result of identification by the analyzing device 200 may be output to a user from the analyzing device 200, for example, or may be transmitted to the sensor device 100 from the analyzing device 200, and then output to the user from the sensor device 100.

According to the above-described system 10, a user who plays tennis using the racket 12 is able to understand which part of the racket 12 the ball 14 has collided with, in another word, at which part of the racket 12 the user has struck the ball 14. Here, the part of the racket 12 assumed to be most effective at striking the ball 14 is called the sweet spot. For example, the tennis proficiency level of the user can be estimated according to the ratio with which the ball 14 strikes the vicinity of this sweet spot. Further, vibrations and impacts transmitted to the hand of the user by striking the ball 14 with the racket 12 will change according to which part of the racket 12 the ball 14 strikes, and will be smallest in the case where the ball 14 strikes the vicinity of the sweet spot. Therefore, the physical load of the user from playing tennis can be estimated by the distribution of the positions where the ball 14 strikes.

Note that it is possible to add additional sensors and information acquisition means to the system 10 and to combine information obtained from these additional sensors and information acquisition means with the above information so as to provide varied and useful information to the user.

Hereinafter, configurations of the above sensor device 100 and the above analyzing device 200 will each be described in detail, and in addition, an example of the theory and a process of identifying a position where the ball 14 collides with (touches) the racket 12, and an example display of the results in the first embodiment of the present disclosure, will be described. Note that in this specification, "the second object collides with the first object" means "the second object touches the first object in a state where vibrations are generated in the first object (where the quantity of motion is large, the touching time is short, or the like). That is, to "collide" means one of modes of "touch" in this specification.

(1-2. Configuration of the Sensor Device)

Figure 2:
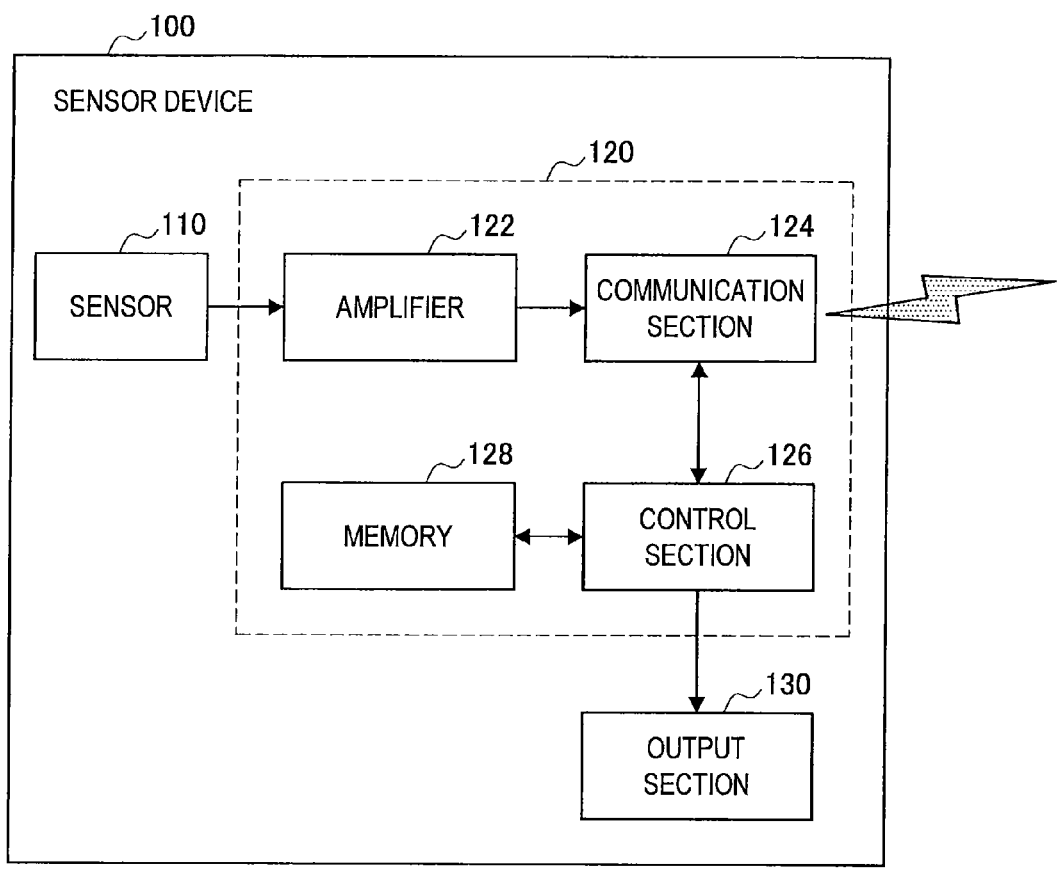
FIG. 2 is a block diagram showing an example of a functional configuration of a sensor position according to a first embodiment of the present disclosure.
Figure 3A:
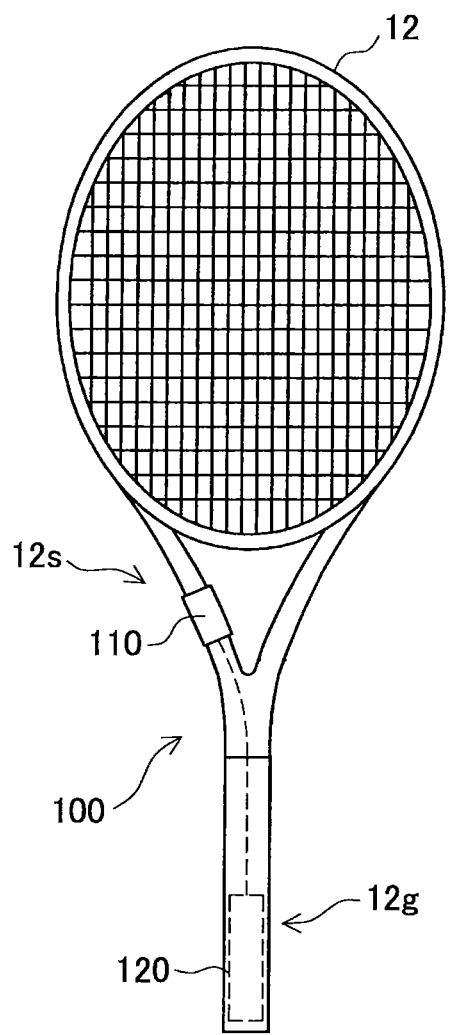
FIG. 3A is a figure in which a sensor device mounted on a racket is viewed from a front according to a first embodiment of the present disclosure.
Figure 3B:
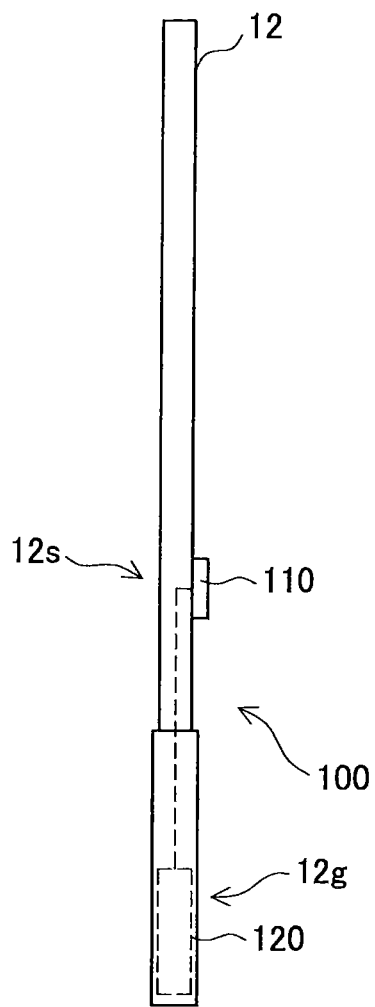
FIG. 3B is a figure in which a sensor device mounted on a racket is viewed from a side according to a first embodiment of the present disclosure.
Figure 4:
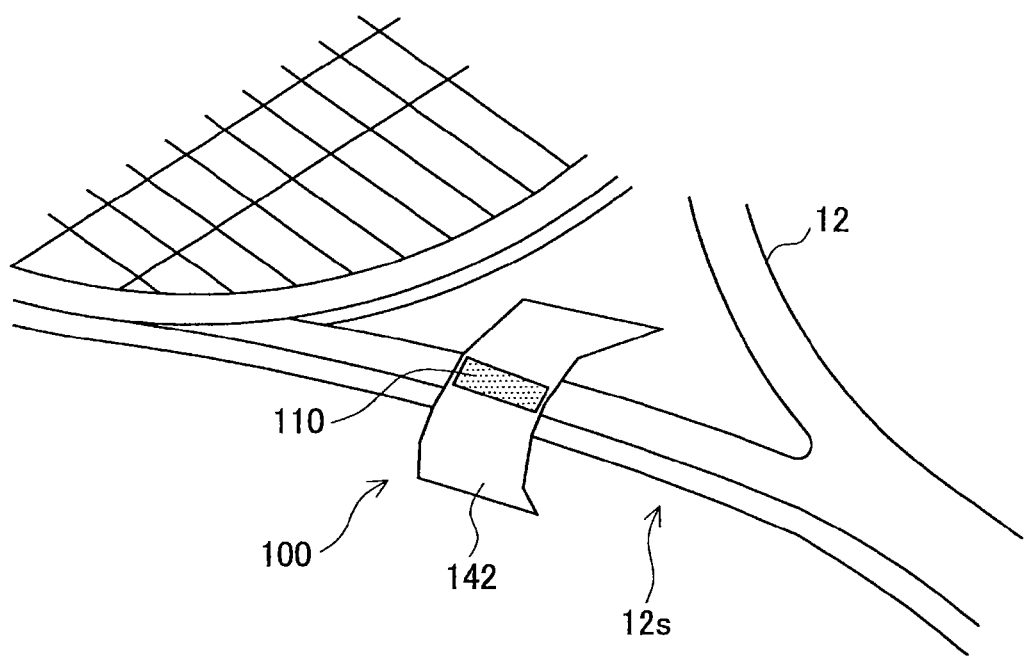
FIG. 4 is a figure showing an example of a method which mounts a sensor device on a racket in a first embodiment of the present disclosure.
Figure 5:
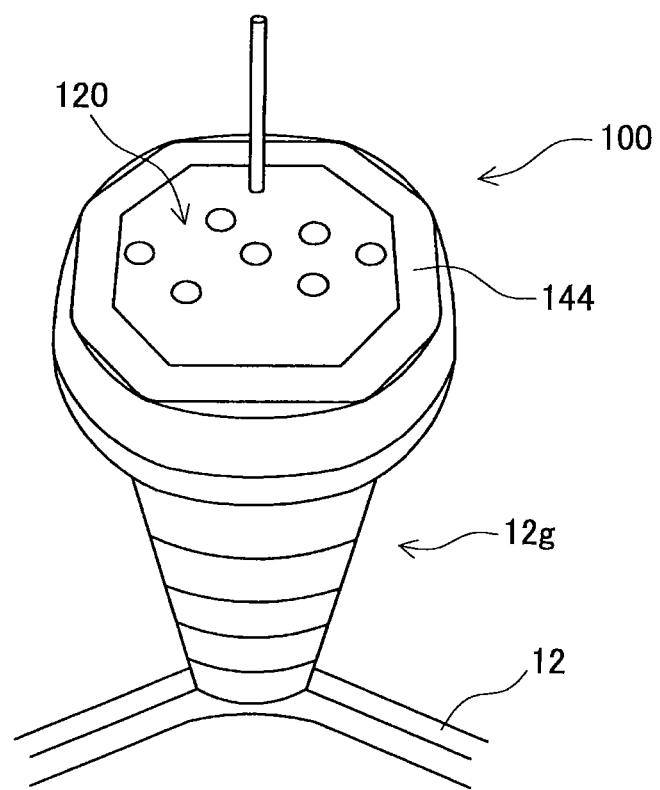
FIG. 5 is a figure showing another example of a method which mounts a sensor device on a racket in a first embodiment of the present disclosure.

Next, a configuration of a sensor device according to the first embodiment of the present disclosure will be described with reference to FIGS. 2 to 5. FIG. 2 is a block diagram showing an example of a functional configuration of a sensor device according to the first embodiment of the present disclosure. FIG. 3A is a figure in which a sensor device mounted on a racket is viewed from the front according to the first embodiment of the present disclosure. FIG. 3B is a figure in which a sensor device mounted on a racket is viewed from the side according to the first embodiment of the present disclosure. FIG. 4 is a figure showing an example of a method which mounts a sensor device on a racket in the first embodiment of the present disclosure. FIG. 5 is a figure showing another example of a method which mounts a sensor device on a racket in the first embodiments of the present disclosure.

(Functional Configuration)

Referring to FIG. 2, the sensor device 100 includes a sensor 110, an amplifier 122, a communication section 124, a control section 126, memory 128, and an output section 130. The amplifier 122, the communication section 124, the control section 126, and the memory 128 are collectively called a circuit section 120.

The sensor 110 is a sensor which outputs vibration data by detecting vibrations when the ball 14 collides with the racket 12. The sensor 110 is implemented by a piezoelectric element, a strain gauge, an acceleration sensor, or the like. For example, when a film type piezoelectric element is used from among these, a detected frequency band and a dynamic range will both expand, waterproofing and impact-proofing will excel, and there will be an advantage of being able to stably detect vibrations by enduring the use of the racket 12.

The amplifier 122 is included in the case where vibration data detected by the sensor 110 is amplified. For example, in the case where the sensor 110 is such a film type piezoelectric element, since the current output from the piezoelectric element is small, it is possible to amplify only a change in electrostatic capacity of the piezoelectric element by vibrations, by using a charge amplifier as the amplifier 122. In addition to this, an appropriate amplifying circuit may be used in the amplifier 122, according to the type of the sensor 110.

The communication section 124 is a communication interface which transmits vibration data, output from the sensor 110 and amplified as necessary by the amplifier 122, to the analyzing device 200. For example, wireless communications are used for sending and receiving the vibration data. The communication system is not particularly limited, and in the case where the analyzing device 200, for example, is in the vicinity of the sensor device 100, it is possible to use near field communications such as Bluetooth (registered trademark) or a wireless LAN (Local Area Network). Further, the communication section 124 may receive information related to a collision position from the analyzing device 200, as an analytical result of the transmitted vibration data.

The control section 126 is implemented by a CPU (Central Processing Unit) operated by a program stored in the memory 128, for example, and controls each section of the sensor device 100. In the first embodiment of the present disclosure, the control section 126 controls the communication section 124, so that the vibration data are selectively transmitted to the analyzing device 200 at the time of the collision of the ball 14. More specifically, the control section 126 may acquire the amplitude of the vibrations shown by the vibration data input from the amplifier 122 to the communication section 124, and perform control such that the communication section 124 transmits the vibration data to the analyzing device 200 in the case where this amplitude is at or above a prescribed threshold. In the case where some data are transmitted to the analyzing device, there are cases where it is not desirable to increase power consumption by continuing communications. Accordingly, as shown above, while the ball 14 is not colliding with the racket 12, the transmission of the vibration data by the communications section 124 is stopped, and the electric power necessary for communication can be economized. Needless to say, the configuration of the sensor device 100 may be simplified, without such a control of the communications section 124, by the control section 126.

Further, the control section 126 may provide information related to the collision position, which the communication section 124 has received from the analyzing device 200, to the output section 130 (described later) as information presented to the user of the racket 12.

The memory 128 is provided by RAM (Random Access Memory) or ROM (Read Only Memory) included in the circuit section 120, and temporarily or permanently stores the various data used for the operations of the sensor device 100. The memory 128 stores a program for operation by a CPU which executes functions of the control section 126, for example. Further, the memory 128 may temporarily store, as a buffer, the vibration data output by the sensor 110 and information related to the collision position, which the communication section 124 receives.

The circuit section 120 which includes the amplifier 122, the communication section 124, the control section 126, and the memory 128 is mounted on the racket 12 as a part of the sensor device 100. It is desirable for the racket 12 to have a waterproofing process performed on the circuit section 120 in the case of being used outdoors, or in the case where it is possible for moisture to adhere, such as sweat. Further, it is desirable for a vibration isolation process to be performed on the circuit section 120, since vibrations are generated in the racket 12 when striking the ball 14 and when the user moves. For example, a resin coating may be applied to the circuit section 120 as such a waterproofing process and a vibration isolation process.

The output section 130 presents the information related to the collision position, which the communication section 124 has received from the analyzing device 200, to the user of the racket 12. The presentation of such information may be visual, for example, or may use voice or vibration. The output section 130 is implemented as a suitable output device, according to the method of presentation of the information, such as an LED (Light Emitting Diode) or display which visually presents information, a speaker or buzzer which presents information by voice, or an actuator which presents information by vibration.

The actuator, within the example of the above output section 130, may be implemented by energizing the piezoelectric element used as the sensor 110, for example. It is possible for the piezoelectric element to be used as an actuator by energizing. Further, a speaker may amplify and reproduce the vibration data as a voice as it is. Needless to say, in the case where the communication section 124 does not receive information related to the collision position, the output section 130 may not be included.

(Mounting on the Racket)

Referring to FIG. 3A and FIG. 3B, the sensor device 100 is mounted on a part from a shaft part 12s to a grip part 12g of the racket 12, in the first embodiment of the present disclosure. In the example shown in the figures, the sensor 110 and the circuit section 120 are mounted on the shaft part 12s and the grip part 12g, respectively. Note that while the output section 130 is not shown in the figures, as it is an additional structural element, it may be mounted on a part identical to that of the circuit section 120, for example.

The sensor 110 is mounted on a surface of the shaft part 12s such as shown in the figures. The shaft part 12s is a part different from a part where the ball 14 originally collides at the racket 12, that is, the so-called face. The influence of the sensor 110 on the operation, in which the user strikes the ball 14 at the racket 12, decreases by mounting the sensor 110 on this part. More specifically, in the case where the sensor 110 is mounted on a face part far from the center of gravity of the racket 12, there will be an influence on the operation, in which the user strikes the ball 14, by changing the center of gravity of the racket 12, and in the case where the sensor 110 is mounted on the shaft part 12s near the center of gravity of the racket 12, such an influence will be small. Further, since the shaft part 12s is separated from the grip part 12g, where the user grips the racket 12, the sensor 110 mounted on the shaft part 12s may not obstruct when the user grips the racket 12. In addition, breaking the sensor 110 by an impact, for example, can be prevented by mounting the sensor 110 on the shaft part 12s, where the possibility of a direct collision by the ball 14 is low.

Here, the racket 12 has a front and a rear surface, and the sensor 110 is mounted on either the front or the rear surface of the racket 12 at the shaft part 12s. Further, the racket 12 has an approximately laterally symmetrical shape, and the sensor 110 is mounted on either a left or a right side of the racket 12, at the shaft part 12s. In this way, it becomes possible to identify the front/rear surface or the left/right side of the collision position using the vibration data, such as described later, by mounting the sensor 110 at a non-symmetrical position for the front/rear surface or the left/right side of the racket 12.

The circuit section 120 is mounted inside the grip part 12g, such as shown in the figures. Generally, the grip part 12g of the racket 12 has a cavity inside. The sensor device 100 can be mounted without generating a projecting section or the like on the surface of the racket 12, for example, by mounting the circuit section 120 in this cavity section. Further, since the grip part 12g is a part that is gripped by the user when the user is striking the ball 14, the vibrations when striking the ball 14 will be weaker compared to other parts of the racket 12, and the circuit components included in the circuit section 120, for example, can be protected from impact.

Note that the mounting method of the sensor device 100 on the racket 12 represented by FIGS. 3A and 3B is one example, and other various mounting methods are also possible. In the above example, the sensor 110 and the circuit section 120 are mounted on separate parts of the racket 12, and are connected by wiring included on the surface of the racket 12 or inside thereof. However, for example, the sensor 110 and the circuit section 120 may be both mounted on the same part of the racket 12. Specifically, the sensor 110 and the circuit section 120 may be both mounted on the shaft part 12s. Further, the sensor 110 and the circuit section 120 may be both mounted on the grip part 12g.

An example of a mounting member in the case where the sensor device 100 is mounted on the shaft part 12s of the racket 12 is shown in FIG. 4. The mounting member in this case is a belt 142. The belt 142 is a rubber belt locked by a hook-and-loop fastener, for example, and can be wrapped around the shaft part 12s. As above, mounting on the shaft part 12s may be performed for only the sensor 110 from within the sensor device 100, or may be performed for the entire sensor device 100 including the sensor 110 and the circuit section 120. By using the belt 142, the sensor device 100 can be mounted on the shaft part 12s without a process such as a perforation for joining elements on the racket 12 or without applying an adhesive material on the surface of the racket 12. Therefore, detaching the sensor device 100 from the racket 12 is easy, and replacing the sensor device 100 onto a new racket 12, which the user has bought as a replacement for the racket 12, is easy.

An example of a mounting member in the case where the sensor device 100 is mounted on the grip part 12g of the racket 12 is shown in FIG. 5. The mounting member in this case is a casing 144. The casing 144 is formed by resin, for example, has a shape corresponding to the cavity inside the grip part 12g, and is fitted to the inside of the grip part 12g. As above, mounting on the grip section 12g may be performed for only the circuit section 120 from within the sensor device 100, or may be performed for the entire sensor device 100 including the sensor 110 and the circuit section 120. By using the casing 144, the sensor device 100 can be mounted on the grip part 12g without a process such as a perforation for joining elements on the racket 12 or without applying an adhesive material on the surface of the racket 12. Further, if the shape of the cavity inside the grip part 12g is the same as that of another racket 12, the replacing of the sensor device 100 onto a new racket 12, which the user has bought as a replacement for the racket 12, is easy.

(1-3. Configuration of the Analyzing Device)

Figure 6:
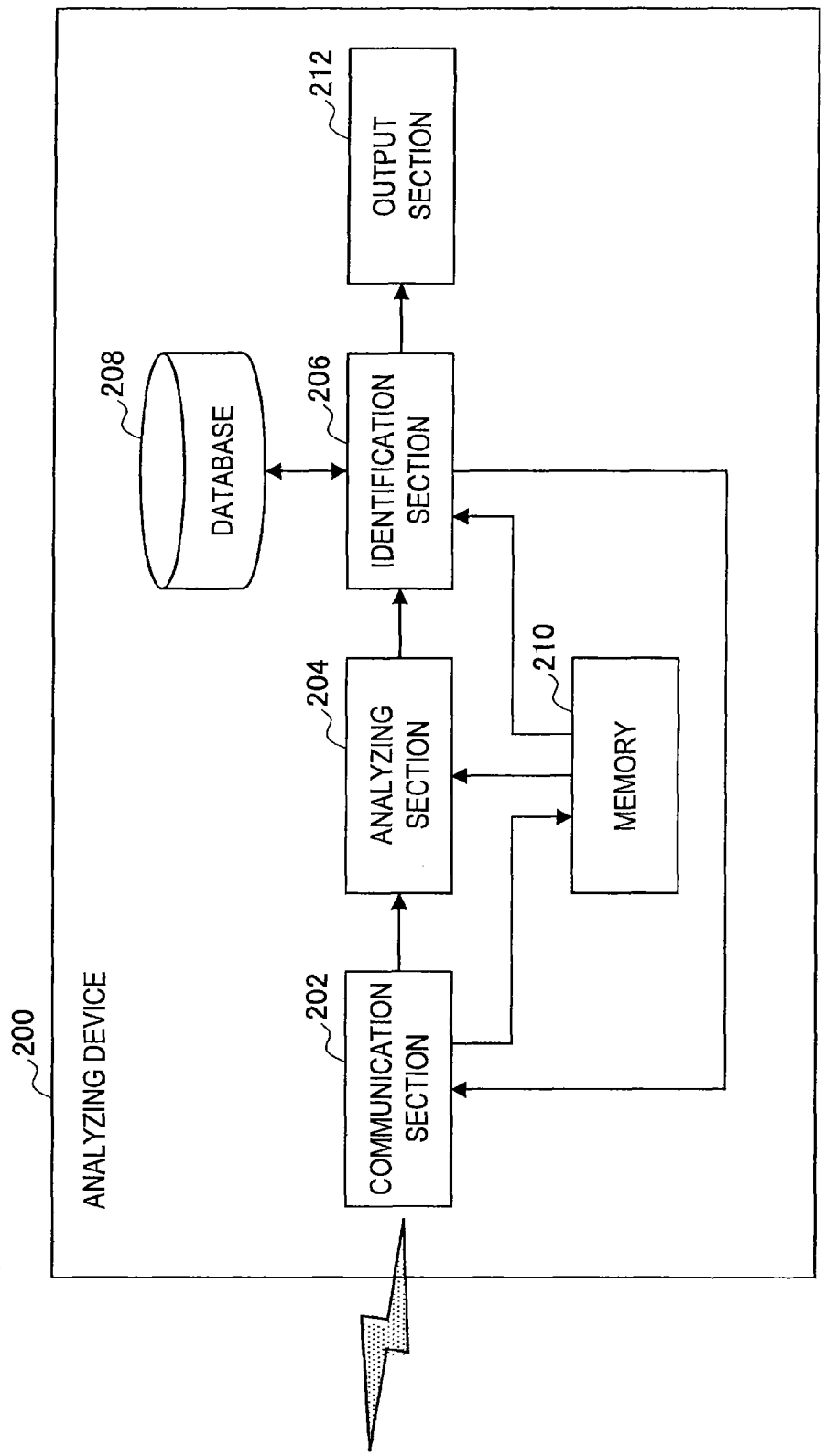
FIG. 6 is a block diagram showing an example of a functional configuration of an analyzing device according to a first embodiment of the present disclosure.

Next, a configuration of an analyzing device according to the first embodiment of the present disclosure will be described with reference to FIG. 6. FIG. 6 is a block diagram showing an example of a functional configuration of an analyzing device according to the first embodiment of the present disclosure.

(Functional Configuration)

Referring to FIG. 6, the analyzing device 200 includes a communication section 202, an analyzing section 204, an identification section 206, a database 208, memory 210, and an output section 212.

The analyzing device 200 is a portable information processing apparatus, such as a smart phone, a tablet type PC (Personal Computer), a PDA (Personal Digital Assistant), a portable game machine, or a portable music player. In this case, the result of the analysis is able to be understood in real time, by the user of the racket 12 carrying the analyzing device 200. Needless to say, the analyzing device 200 may be another information processing apparatus, such as a note type or desktop type PC, and may receive vibration data from the sensor device 100 according to communications through a communication line.

The communication section 202 is a communication interface which receives vibration data from the sensor device 100. As described for the sensor device 100, near field communications, such as Bluetooth (registered trademark) or a wireless LAN, can be used for sending and receiving the vibration data. For example, in the case where the sensor device 100 continuously transmits the vibration data, the received vibration data are temporarily stored in the memory 210 for the processes of the analyzing section 204, described later. Further, the communication section 202 may transmit information related to the collision position identified by the identification section 206 to the sensor device 100.

The analyzing section 204 is implemented by a CPU operated by a program stored in the memory 210, for example, and analyzes vibration data which the communication section 202 has received. For example, the analyzing section 204 extracts the vibration data of an impact section corresponding to the vibrations when the ball 14 collides with the racket 12, from the vibration data which the communication section 202 continuously receives. For the process of this extraction, the communication section 202 temporarily stores the received vibration data in the memory 210, and the analyzing section 204 may extract the vibration data of a necessary section from the memory 210. Note that in the case where the way the vibration data are selectively transmitted at the time of the collision of the ball 14 is controlled by the control section 126 of the sensor device 100 as above, the analyzing section 204 may not implement the extraction of the impact section, since the impact section has already been extracted.

Further, the analyzing section 204 analyzes the frequency of vibrations for the impact section of the vibration data. The analyzing section 204 implements a FFT (Fast Fourier Transform), for example, and acquires a frequency spectrum of the vibrations represented by the vibration data.

The identification section 206 is implemented by a CPU operated by a program stored in the memory 210, for example, and identifies the collision position on the racket 12 which the ball 14 collides with, by comparing the vibration characteristics at each position the ball 14 collides with the racket 12, with the vibration characteristics of the vibration data which the analyzing section 204 has extracted. In the first embodiment of the present disclosure, the vibration characteristics at each position from within a position group on the racket 12 defined beforehand is stored in the database 208. The identification section 206 refers to the vibration characteristics at each of these positions by accessing the database 208, and specifies the position having vibration characteristics best corresponding to the vibration characteristics of the vibration data as the collision position. Note that the theory and the details of the process implemented here will be described later.

Here, information related to the collision position identified by the identification section 206 may be provided to the output section 212, or may be transmitted to the sensor device 100 through the communication section 202. Further, the information related to the collision position may be transmitted to another device through the communication section 202. The other device can be any of a variety of PCs and server devices that provide users with services through a network, for example.

The database 208 is implemented by RAM, ROM, a storage device, or a removable recording medium included in the analyzing device 200, and stores the vibration characteristics at each position from within a position group on the racket 12 defined beforehand. As described later, these vibration characteristics may be a frequency spectrum, and are stored as a frequency spectrum of an output signal to a prescribed input signal, or as a transfer function to a given input signal, for example.

The memory 210 is implemented by RAM, ROM, a storage device, or a removable recording medium included in the analyzing device 200, and temporarily or permanently stores various data used in the operations of the analyzing device 200. The memory 201 stores a program for a CPU to operate, which executes the analyzing section 204 and the identification section 206, for example. Further, the memory 210 may temporarily store, as a buffer, vibration data received by the communication section 202, and information related to the collision position output by the identification section 206.

The output section 212 presents the information related to the collision position output by the identification section 206 to a user. The presentation of this information may be visual, for example, or may use voice or vibration. The output section 212 is implemented as a suitable output device, according to the method of presentation of the information, such as an LED or a display which visually presents information, a speaker or buzzer which presents information by voice, or an actuator which presents information by vibration.

(1-4. Theory of Collision Position Identification)

Figure 7:
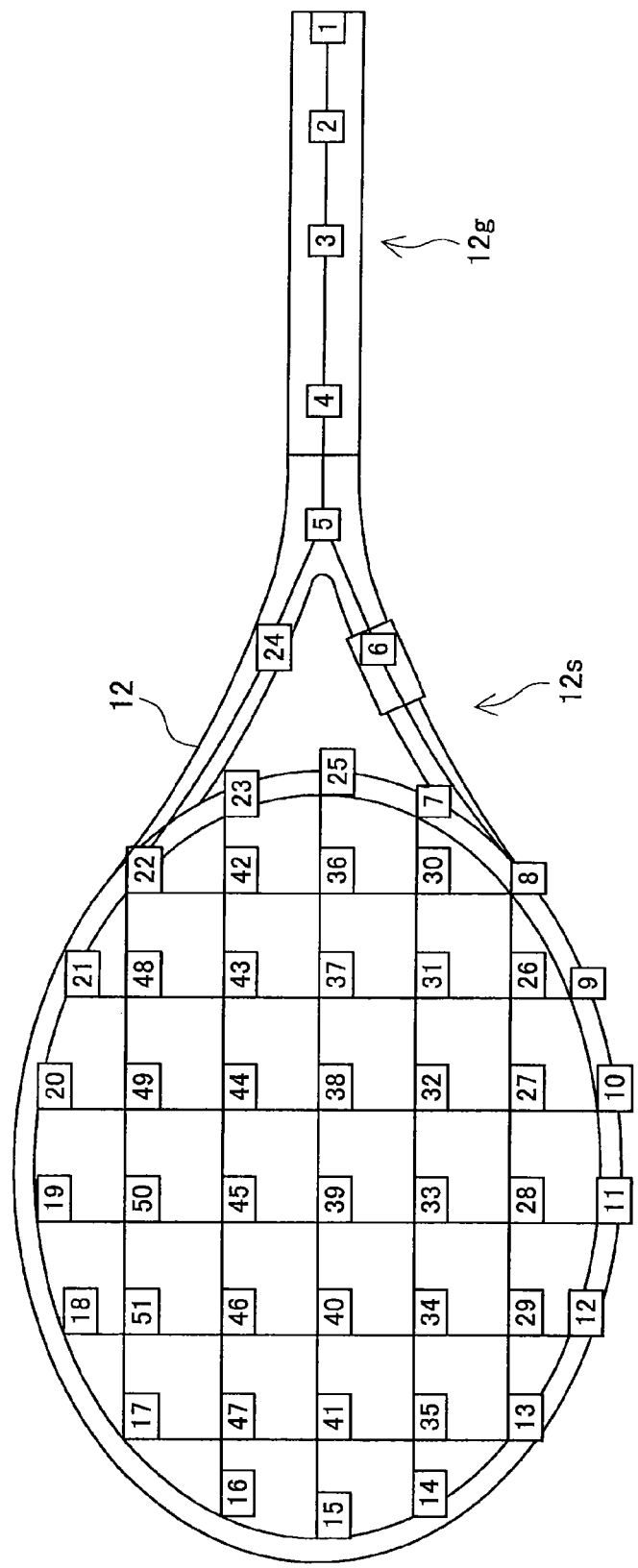
FIG. 7 is a figure showing an example of a position group on a racket set beforehand in a first embodiment of the present disclosure.
Figure 8:
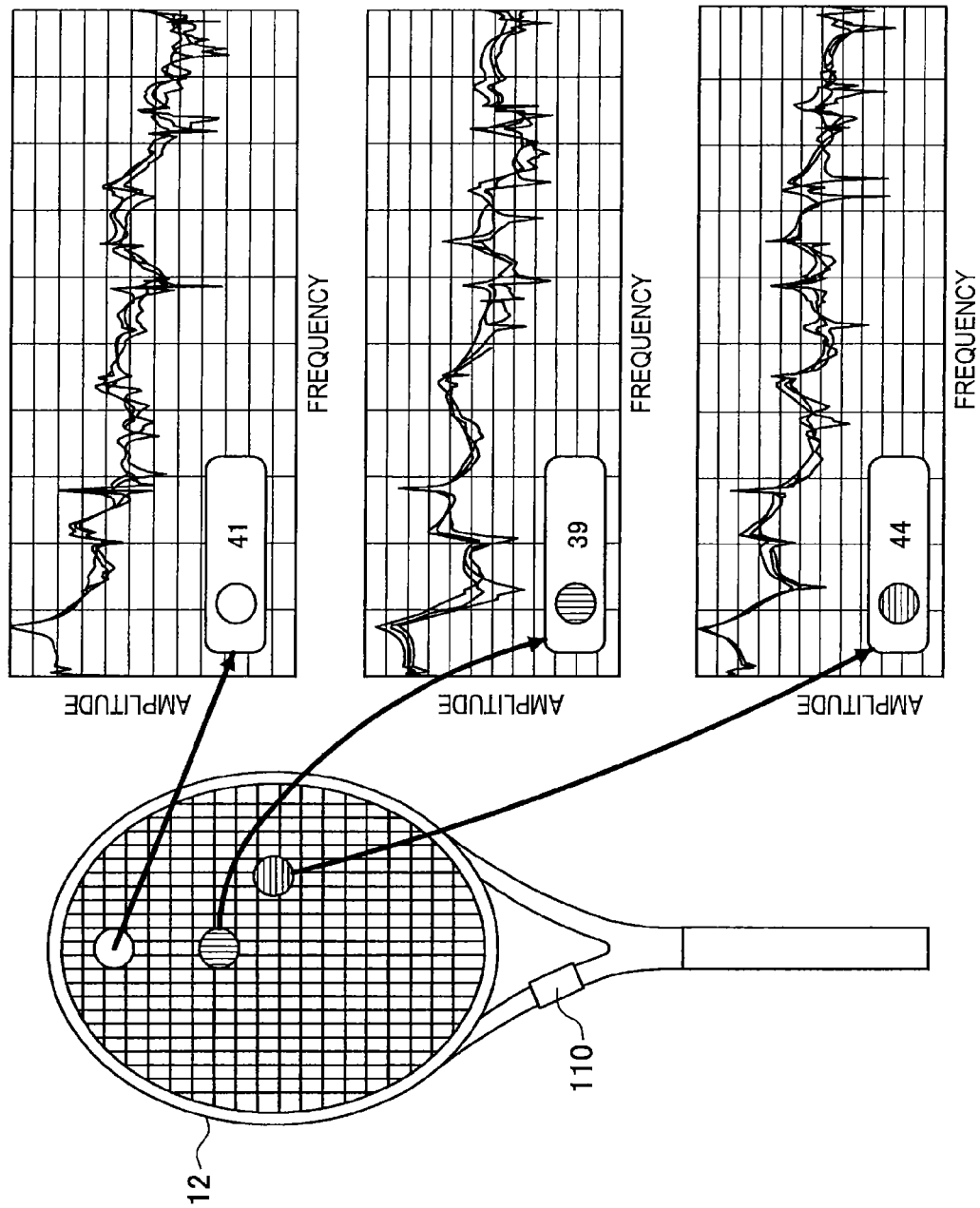
FIG. 8 is a figure showing an example of a vibration characteristic at each position on a racket in a first embodiment of the present disclosure.
Figure 9:
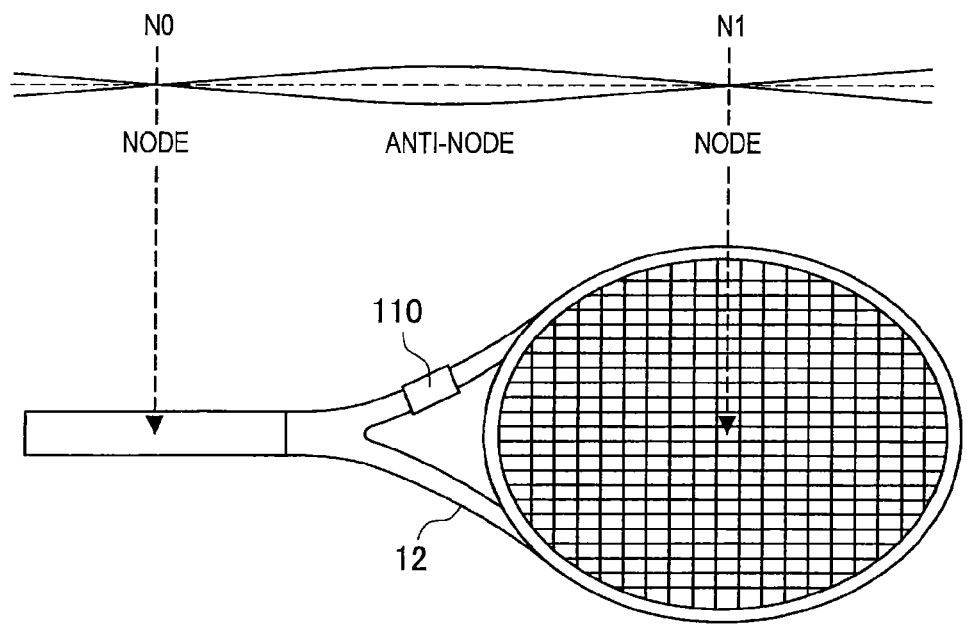
FIG. 9 is a figure for describing an estimation of a collision position in a first embodiment of the present disclosure.

Next, a theory of collision position identification in the first embodiment of the present disclosure will be described with reference to FIGS. 7 to 10. FIG. 7 is a figure showing an example of a position group on a racket set beforehand in the first embodiment of the present disclosure. FIG. 8 is a figure showing an example of a vibration characteristic at each position on a racket in the first embodiment of the present disclosure. FIG. 9 is a figure for describing an estimation of a collision position in the first embodiment of the present disclosure. FIG. 10 is a figure for further describing an estimation of a collision position in the first embodiment of the present disclosure.

(Definition of a Collision Position Candidate)

FIG. 7 shows an example of a position group on the racket 12 set beforehand, for identification of the collision position. In this way, in the first embodiment of the present disclosure, the position is defined at prescribed intervals on the racket 12, and the position group including such positions is treated as a candidate of the collision position. Note that in the example shown in the figure, while the positions (numbered 1-25) on the shaft part 12s, the grip part 12g, and parts of the frame are defined, these may not be necessary, and only the positions (numbered 26-51) of the face part may be defined.

FIG. 8 shows an example of vibration characteristics at each position from within the position group set as above. Here, the vibration characteristics are a transfer function (FRF: Frequency Response Function) up until the position of the sensor 110, in the case where prescribed vibrations are input to each position as an input signal. The transfer function, in the case where an identical impulse input is given to each of the three positions (number 41, number 39, number 44) from within the above position group, is shown in the figure. In this way, even in the case where an identical input is given, the transfer function will be different according to the position on the racket 12. Therefore, conversely speaking, if the transfer function when the collision of the ball 14 is transmitted as vibrations is known, it is possible to estimate the position on the racket 12 which the ball 14 collides with.

Such an analyzing technique of vibrations is known as modal analysis. Modal analysis is the analysis of vibration characteristics inherent in each object, for example, an eigenmode or a natural frequency, a modal dampening ratio, and the like. Specifically, the natural frequency is observed as a pole (peak) of the transmission function, and signifies that the more the sharpness of this peak increases, the more the modal dampening ratio decreases. Generally, the vibrations of the object are expressed as the vibrations at a plurality of natural frequencies that are overlapping. It is desirable in the first embodiment of the present disclosure to focus on such vibration characteristics inherent in the racket 12, and to estimate an excitation point, namely, a collision position of the ball 14, from vibrations of the racket 12 by applying the technique of modal analysis.

The waveform of the vibration, in the case where the racket 12 vibrates in a certain vibration mode, is shown in FIG. 9. According to the findings of modal analysis, there are vibration modes respectively corresponding to a plurality of natural frequencies (called 1st, 2nd, 3rd . . . in an order from lowest to highest frequency) in the object, and the vibration of the object is described as an overlapping of the vibrations at each vibration mode. The waveform in the case of vibrating is determined according to each vibration mode. The example shown in the figure is a waveform in a longitudinal surface direction in the case where the racket 12 is vibrating in a 3rd vibration mode (for example, 170 Hz). In this case, a standing wave having two nodes N0, N1 is generated in the waveform. Node N0 is the grip part, and node N1 is the so-called sweet spot.

Here, the part called the sweet spot of the racket will be described. The sweet spot generally indicates either (i) a COP (Center of Percussion), (ii) a Vibration Node, or (iii) a Power Point. (i) The COP is a position at which the impact transmitted to the hand holding the racket is minimized when the racket strikes the ball, in a word, a center of percussion, and is a part called the core in the case of a baseball bat. The position of the COP changes according to the speed at which the racket is swung. (ii) The Vibration Node is a position at which the vibration of the racket is minimized when the racket strikes the ball. As above, since the racket has inherent vibration characteristics, the position of the Vibration Node does not change according to the speed at which the racket is swung, or the way the ball is hit. (iii) The Power Point is a position at which the power transmitted to the ball is maximized. The Power Point is the point at which the ball leaps most, and the position changes according to the speed at which the racket is swung. From among these, (ii) the Vibration Node is treated as the sweet spot in the first embodiment of the present disclosure.

In the case where a sweet spot is defined as described above, the position of the node N1 corresponding to the sweet spot can be easily understood in the waveform shown in FIG. 9. In a word, in the case where the ball 14 collides with the position of the node N1, a vibration in a 3rd vibration mode (for example, 170 Hz) is not excited since this position is a node related to the 3rd vibration mode. In contrast, in the case where the ball 14 collides with a position separated from the node N1, a vibration in a 3rd vibration mode is excited in the racket 12.

In the example shown in the figure, in the case where the ball 14 collides with a position separated from the node N1, since the sensor 110 is located in a position close to the anti-node of the 3rd vibration mode, a large number of vibrational components by the excited 3rd vibration mode are detected. Conversely speaking, in the case where the large number of the vibrational components by the 3rd vibration mode are detected by the sensor 110, the ball 14 is estimated to have a high possibility of having collided with a position separated from the node N1.

A phase difference of the vibrations of the racket 12, generated according to the difference of the collision positions of the ball 14, is shown in FIG. 10. Similar to that of FIG. 9, the waveform in a longitudinal surface direction, in the case where the racket 12 is vibrating in a 3rd vibration mode, is shown in the figure. In the example of (a), the ball 14 collides with a position separated from the node N1 on the grip side, and in the example of (b), the ball 14 collides with a position separated from the node N1 on the opposite side to that of the grip.

Here, as described with reference to FIG. 9, in both of the examples (a) and (b), a vibration in the 3rd vibration mode is excited in the racket 12, since the ball 14 collides with a position separated from the node N1. However, the vibrations detected at the position of the sensor 110 have a phase opposite to those of the examples of (a) and (b). In the case of (a), the position of the sensor 110 becomes a mountain of a waveform immediately after the collision, since the collision position of the ball 14 is on the opposite side to the sensor 110 with the node N1 in between. On the other hand, in the case of (b), the position of the sensor 110 becomes a valley of a waveform immediately after the collision, since the collision position of the ball 14 is on the same side as the sensor 110 from the viewpoint of the node N1.

Note that the phase of the vibration, in the case where the ball 14 collides with a certain position on the rear surface of the racket 12, will become a phase opposite to the phase of the vibration in the case where the ball 14 collides with the same position on the front surface. Therefore, it is possible to identify whether the ball 14 collides with the front surface or the rear surface of the racket 12, by identifying a similar waveform to which the phase is reversed.

As described above with reference to FIGS. 9 and 10, the amplitude and phase of the vibration in each vibration mode generated in the racket 12 will differ, according to the collision position of the ball 14. The characteristics of the vibrations detected by the sensor 110 according to the collision position of the ball 14 will change as a result of the vibration in each vibration mode overlapping, such as shown in FIG. 8. Therefore, the collision position of the ball 14 can be detected by analyzing the characteristics of the vibrations detected by the sensor 110.

Note that in the case where the sensor 110 is included on the axis of symmetry of the racket 12, which has an approximately laterally symmetrical shape, the characteristics of the vibrations detected by the sensor 110, in the case where the ball 14 collides with two symmetrical positions for the axis of symmetry, will be substantially identical. Further, in the case where the sensor 110 is included on a side surface, for example, between the front and rear surfaces of the racket 12, the characteristics of the vibrations detected by the sensor 110, in the case where the ball 14 collides with a position identical for each of the front and the rear surfaces, will be substantially identical (in the case where the sensor 110 detects vibrations in a direction perpendicular to the mounted surface. In the case where the sensor 110 detects vibrations in a direction parallel to the mounted surface, there is no limitation to the above case). Therefore, as stated above, it is desirable to mount the sensor 110 at a position non-symmetrical with regards to the front and rear surface and the left and right sides of the racket 12, so as to identify the front and rear surface or the left and right sides of the racket 12 in the estimation of the collision position.

(1-5. Process Example of Collision Position Identification)

Figure 11:
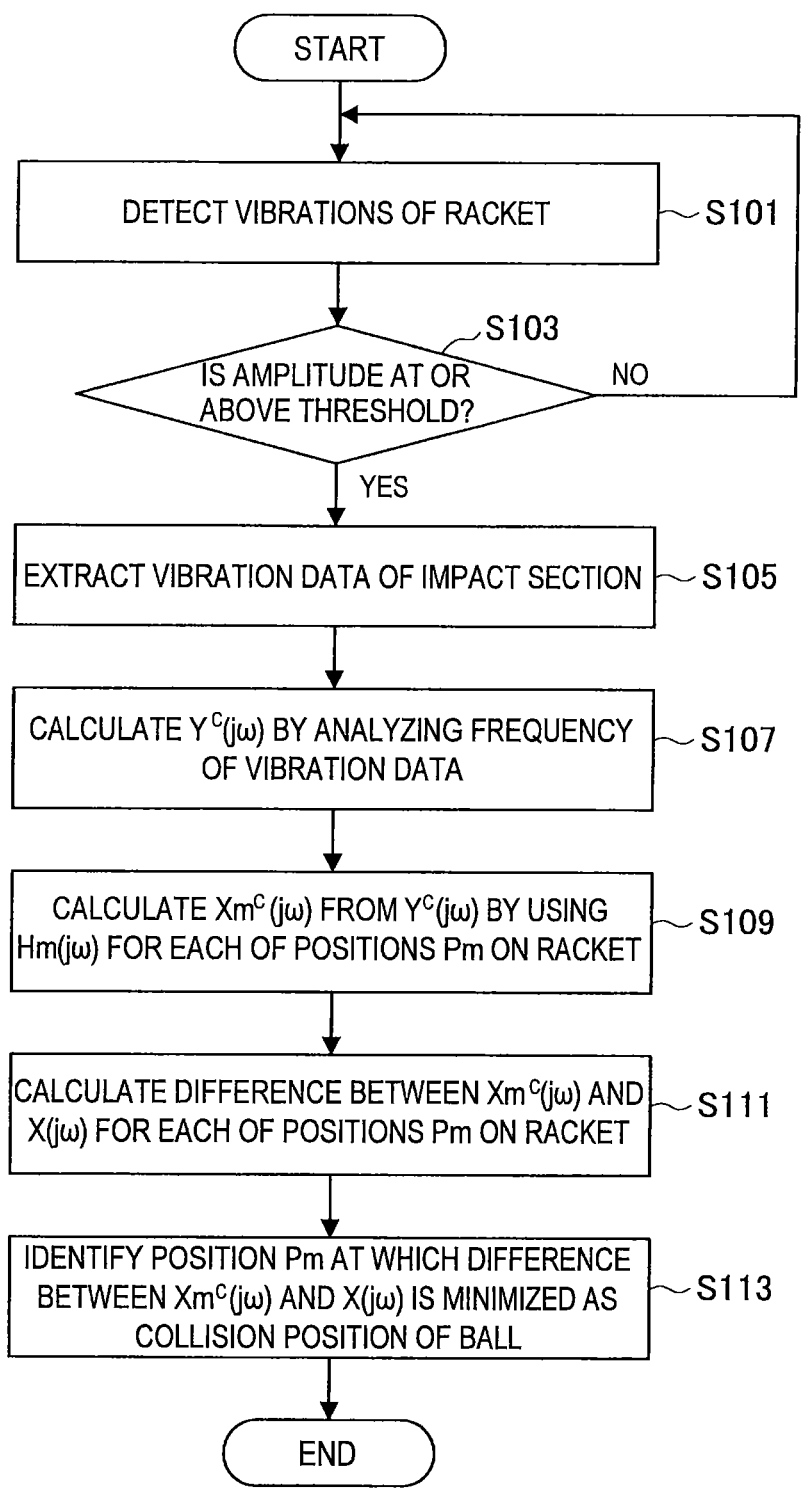
FIG. 11 is a flowchart showing a first example of a collision position identification process in a first embodiment of the present disclosure.
Figure 12:
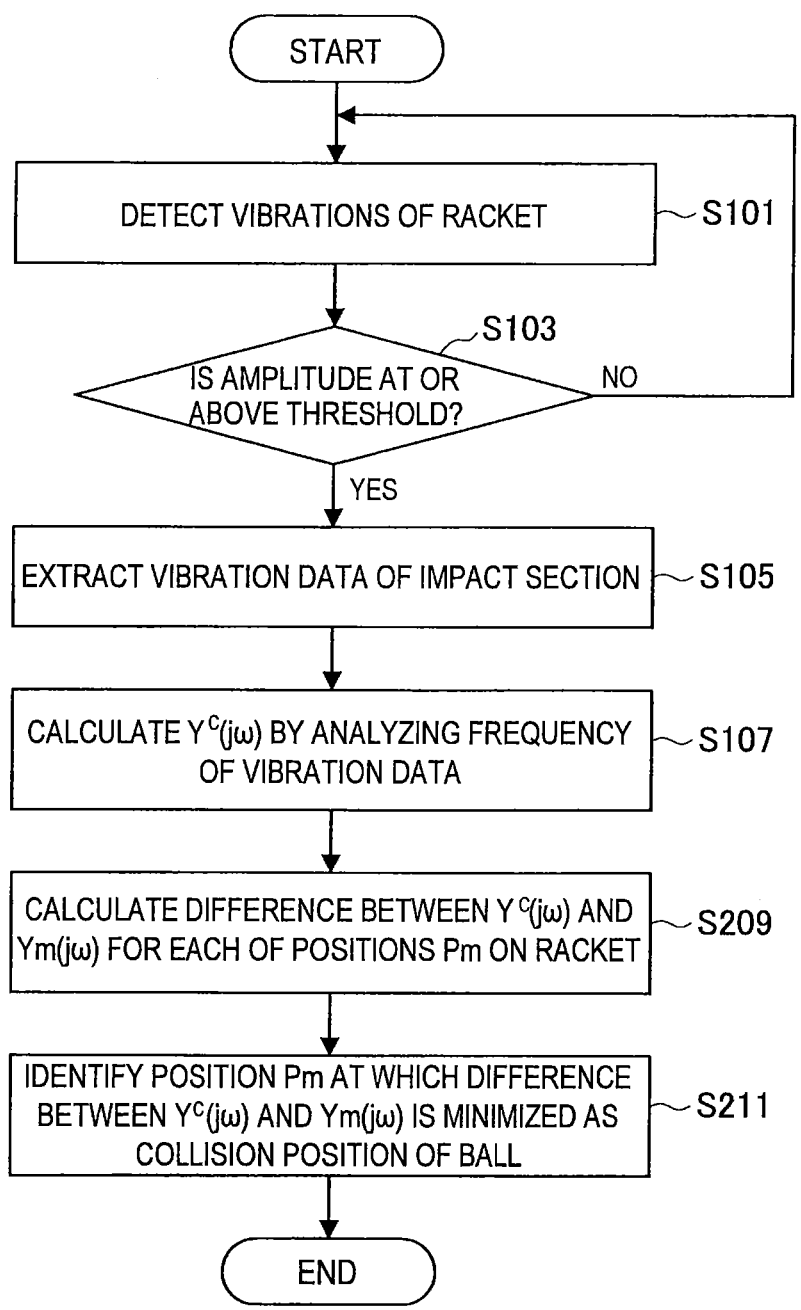
FIG. 12 is a flowchart showing a second example of a collision position identification process in a first embodiment of the present disclosure.

Next, two examples of the process of collision position identification in the first embodiment of the present disclosure will be described with reference to FIGS. 11 and 12. FIG. 11 is a flowchart showing a first example of a collision position identification process in the first embodiment of the present disclosure. FIG. 12 is a flowchart showing a second example of a collision position identification process in the first embodiment of the present disclosure.

(First Process Example)

Referring to FIG. 11 in the first process example, first in step S101, the sensor 110 of the sensor device 100 detects vibrations of the racket 12. The detected vibrations are transmitted from the communication section 124 to the analyzing device 200 as vibration data.

Next in step S103, the analyzing section 204 of the analyzing device 200 determines whether or not the amplitude of the vibrations shown by the vibration data received by the communication section 202 is at or above a threshold. Here, for example, the vibrations of the racket 12 are determined to be either the displacement of the racket 12 itself or the collision of the ball 14.

In the case where the amplitude of the vibrations is determined to be at or above the threshold in the above step S103, in step S105, the analyzing section 204 extracts the vibration data of an impact section. The impact section is a section of the vibration data which shows the vibrations of the racket 12 at a prescribed time after the ball 14 collides with the racket 12. In contrast, in the case where the amplitude of the vibrations is determined not to be at or above the threshold in the above step S103, the analyzing section 204 does not proceed with further analysis, and the process returns to step S101.

Note that in the case where the control section 126 of the sensor device controls the communication section 124 so that the vibration data are selectively transmitted to the analyzing device 200 at the time of the collision with the ball 14, the processes of the above steps S103 and S105 may be substituted with the processes of the communication section 124 and the control section 126. In this case, the communication section 202 of the analyzing device 200, for example, may receive vibration data of the extracted impact section, and the analyzing section 204 may analyze the vibration data as it is.

Next in step S107, the analyzing section 204 calculates the vibration data, that is, a frequency spectrum $Y^C(j\omega)$ of the output signal from the sensor 110, by implementing a frequency analysis of the vibration data.

Next in step S109, the identification section 206 calculates a frequency spectrum $X_m^C(j\omega)$ of the input signal from the frequency spectrum $Y^C(j\omega)$ of the vibration data, by using a transfer function (FRF) $H_m(j\omega)$ stored in the database 208, for each of the positions $P_m$ (m=1, 2, 3, . . . ) on the racket 12. Note that here, the frequency spectrums $X_m^C(j\omega)$ and $Y^C(j\omega)$ and the transfer function $H_m(j\omega)$ are expressed by complex numbers, and are signals which simultaneously include amplitude information and phase information of the frequency. Further, j represents an imaginary unit, and ω represents an angular velocity.

Next in step S111, the identification section 206 calculates the difference between the frequency spectrum $X_m^C(j\omega)$ of the input signal calculated from the vibration data and the frequency spectrum $X(j\omega)$ of an input signal stored in the database 208, for each of the positions $P_m$ on the racket 12. This difference is calculated as a vector distance, for example. An inner product calculation or a Euclidean distance calculation, for example, can be used in the calculation of the vector distance.

Next in step S113, the identification section 206 identifies a position $P_m$ on the racket 12, at which the difference between the frequency spectrum $X_m^C(j\omega)$ of the input signal calculated from the vibration data and the frequency spectrum $X(j\omega)$ of the input signal is minimized, as the collision position of the ball 14.

An algorithm for collision position identification used by the first process example described above will be further described.

The input signal to this position, when the ball 14 collides with the position $P_m$ on the racket 12, is assumed to be vibrations of the frequency spectrum $X(j\omega)$. These vibrations are transmitted within the racket 12 and are detected as an output signal of the vibrations of the frequency spectrum $Y_m(j\omega)$ at the position of the sensor 110. Here, when the transfer function (FDR) from the position $P_m$ up until the position of the sensor 110 is assumed to be $H_m(j\omega)$, the following relation is realized:

$$Y_m(j\omega)=H_m(j\omega)\cdot X(j\omega) \quad \text{(Equation 1)}$$

Based on the above findings in the first process example, the vibrations (frequency spectrum $Y_m(j\omega)$) at the position of the sensor 110 are measured beforehand, in the case where the ball 14 collides with each of the positions $P_m$ on the racket 12 (an input signal of the frequency spectrum $X(j\omega)$) is given), and a transfer function $H_m(j\omega)$ is calculated beforehand for each of the positions $P_m$. The transfer function $H_m(j\omega)$ is stored in the database 208 along with a label showing the position $P_m$, for example.

Here, from the inverse of the above Equation 1, the following relation is realized:

$$X(j\omega)=Y_m(j\omega)\cdot H_m^{-1}(j\omega) \quad \text{(Equation 2)}$$

Here, $H_m^{-1}(j\omega)$ represents an inverse matrix of the transfer function $H_m(j\omega)$. In the above step S109, by using Equation 2, the identification section 206 calculates the estimated frequency spectrum $X_m^C(j\omega)$ of the input signal from the frequency spectrum $Y^C(j\omega)$ of the vibration data, for each of the positions $P_m$. Specifically, the identification section 206 calculates the estimated frequency spectrum $X_m^C(j\omega)$ of the input signal according to the following equation:

$$X_m^C(j\omega)=Y^C(j\omega)\cdot H_m^{-1}(j\omega) \quad \text{(Equation 3)}$$

In reality, the input signal of the frequency spectrum $X(j\omega)$ is given at any one of the positions $P_m$, by the ball 14 colliding. Therefore, the case where the estimated frequency spectrum $X_m^C(j\omega)$ of the input signal calculated according to the above Equation 3 becomes a shape close to the actual frequency spectrum $X(j\omega)$ is limited to the case where the inverse matrix $H_m^{-1}(j\omega)$ of the transfer function for the positions $P_m$ which the ball actually collides with is used. In cases other than this, since the inverse matrix $H_m^{-1}(j\omega)$ of a transfer function different from the transmission of the actual vibrations is used, the frequency spectrum $X_m^C(j\omega)$ of the estimated input signal calculated according to Equation 3 will become a shape different from that of the frequency spectrum $X(j\omega)$, for example, an insignificant noise waveform. Note that here, the frequency spectrum $X(j\omega)$ is assumed to be measured beforehand by the above mentioned modal analysis. This frequency spectrum $X(j\omega)$ has a temporal waveform close to that of a shock wave (impulse signal), since it is a collision signal of a ball. In the case where the ball actually collides with the racket 12, this collision waveform will appear only at the position $P_m$ which the ball collides with. Further, in this example, the likelihood (degree of similarity) is assumed to be obtained according the calculation of the above mentioned vector distance, by a comparison between the frequency spectrum $X_m^C(j\omega)$ of the estimated input signal and the frequency spectrum $X(j\omega)$.

Note that in the above description, while a common frequency spectrum $X(j\omega)$ is used for all positions $P_m$ as a frequency spectrum of the input signal, a frequency spectrum $X_m(j\omega)$ different for each position $P_m$ may be used.

In this way in the first process example, "the position where the plausible estimated input signal is obtained in the case where the input signal is estimated from the output signal using the transfer function of this position" is identified as the collision position of the ball 14 on the racket 12.

(Second Process Example)

Referring to FIG. 12, steps S101 to S107 in the second process example are processes similar to those of the above first process example.

Following on from steps S101 to S107, in step S209, the identification section 206 of the analyzing device 200 calculates the difference between the frequency spectrum $Y^C(j\omega)$ of the vibration data and the frequency spectrum $Y_m(j\omega)$ of a model output signal stored in the database 208, for each of the positions $P_m$ on the racket 12. This difference is calculated as a vector distance, for example. An inner product calculation or a Euclidean distance calculation, for example, can be used in the calculation of the vector distance.

Next in step S211, the identification section 206 identifies the position $P_m$ on the racket 12, at which the difference between the frequency spectrum $Y^C(j\omega)$ of the vibration data and the frequency spectrum $Y_m(j\omega)$ of the model output signal is minimized, as the collision position of the ball 14.

An algorithm for collision position identification used by the second process example described above will be further described.

As described in the above first process example, the relation of Equation 1 is realized between the frequency spectrum $X(j\omega)$ of the input signal added to the position $P_m$, the frequency spectrum $Y_m(j\omega)$ of the output signal of the sensor 110, and the transfer function (FRF) $H_m(j\omega)$ from the position $P_m$ up until the position of the sensor 110. Here, it is possible to identify the collision position of the ball by identifying the transfer function $H_m(j\omega)$ from the frequency spectrum $Y^C(j\omega)$ of the vibration data. Hereinafter, this method will be described.

The input signal in the case where the ball 14 collides with the racket 12 has characteristics close to those of an impulse signal, since the collision of the ball 14 is momentary. In the case where the frequency spectrum $X(j\omega)$ of the input signal is assumed to be close to that of the frequency spectrum of an impulse signal, it is possible for the frequency spectrum $Y_m(j\omega)$ of the output signal to have characteristics close to those of the transfer function $H_m(j\omega)$, and to be approximated by the transfer function $H_m(j\omega)$ as much as possible.

Based on the above findings in the second process example, the vibration (frequency spectrum $Y_m(j\omega)$) at the position of the sensor 110 is measured beforehand, in the case where the ball 14 collides with each of the positions $P_m$ on the racket 12 (an input signal of the frequency spectrum $X(j\omega)$ close to the impulse signal is given). The frequency spectrum $Y_m(j\omega)$ is stored in the database 208 along with a label showing the position $P_m$, for example. As mentioned above, it is possible for the frequency spectrum $Y_m(j\omega)$ to have characteristics close to those of the transfer function $H_m(j\omega)$, and to be considered to be a signal showing a natural frequency part of the racket 12.

In the above steps S209 to S211, the identification section 206 classifies the frequency spectrum $Y^C(j\omega)$ of the vibration data, when the ball 14 actually collides, into any of the positions $P_m$, by using the frequency spectrum $Y_m(j\omega)$ as "teacher data" of machine learning for each of the positions $P_m$ stored in the database 208. In order for the frequency spectrum $Y_m(j\omega)$ such as above to be used as "teacher data", a plurality of measurements (samples), for example, several tens of measurements, for each position $P_m$ may each be stored in the database 208. By using machine learning, there is an advantage, for example, in that the robustness for the dispersion of the frequency spectrum increases, and the identification rate improves.

In this way in the second process example, the collision position of the ball 14 on the racket 12 is identified by "setting an output signal of each position prepared as a sample as teacher data, and classifying an actual output signal".

(1-6. Display Example of the Results)

Figure 13:
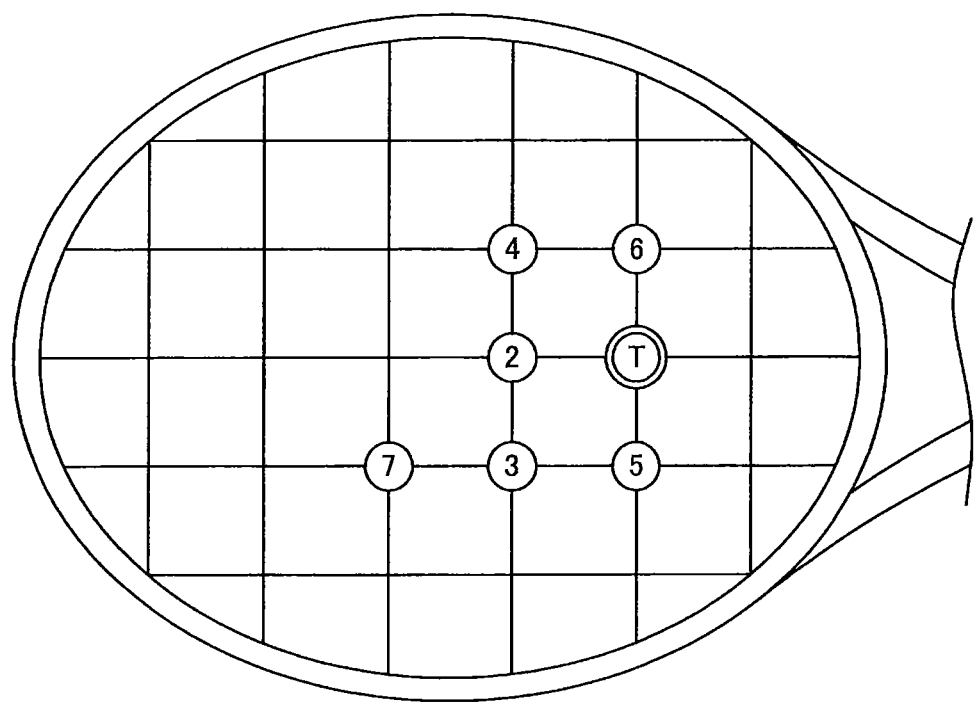
FIG. 13 is a figure showing a first example of a results display in a first embodiment of the present disclosure.

Next, a display example of the results of the collision position identification in the first embodiment of the present disclosure will be described with reference to FIGS. 13 and 14. FIG. 13 is a figure showing a first example of a results display in the first embodiment of the present disclosure. FIG. 14 is a figure showing a second example of a results display in the first embodiment of the present disclosure.

Hereinafter, an example will be described, in the case where the results of the collision position identification is output to the display section as a display in the first embodiment of the present disclosure. As described above, the results of the collision position identification may be output according to a visual presentation to a user by a display of a display screen, or according to the presentation of information by voice or the presentation of information by vibration. Such methods of output themselves are known, and the content may be analogized from the following description. Therefore, the following description does not limit the output of the results of the collision position identification to an output by a display.

In the example of FIG. 13, the position estimated to be where the ball 14 collides with is displayed by being mapped on an image of the racket 12. As described in the above process examples, in the first embodiment of the present disclosure, the collision position of the ball 14 is identified according to an estimation of which position is closest to the collision position from within the positions included in a position group set beforehand on the racket 12. Therefore, there are cases where a plurality of positions, such as "a position estimated to be the nearest", "a position estimated to be the second nearest", "a position estimated to be the third nearest", and the like, are extracted as the collision position. In this case, the plurality of positions may be extracted along with the probabilities that these positions are the collision position.

In the example shown in the figure, seven positions on the racket 12 estimated to be the collision position of the ball 14 are displayed along with symbols showing an order of the highest probability that the position is the collision position. The position indicated by "1" is the position with the highest probability that it is the collision position, and "2" is the position with the next highest probability that it is the collision position, and this continues in a similar manner for "3", "4" . . . "7". In this way, the user can intuitively understand the collision position by presenting the collision position to the user as a map.

In the example of FIG. 14, the position and data with a high probability that it is the collision position of the ball 14 is displayed as a list. For example, as shown in the above second process example, in the case where a plurality of sample data are prepared beforehand for the positions on the racket 12, the collision position can be estimated by showing that the vibrations by the actual collision of the ball 14 are close to vibrations of "which position" or "which sample". In this case, as in the example shown in the figure, the results of a sample unit may be presented to the user as a list as it is. For example, sample "37-3" shows the "third sample of position 37" in the figure.

Further, a prescribed number of samples closest to the actual vibrations may be extracted, according to a k-NN algorithm (k-Nearest Neighbor algorithm), for example, and may specify the positions to which these extracted samples belong the most as the collision position. In the example shown in the figure, in the case where the collision position is specified according to a k-NN algorithm (k=7), for example, the position 37, to which the fourth sample belongs from among the seven samples, is specified as the collision position. Further, a general SVM (Support Vector Machine) method may be used in the machine learning.

For example, as another display example of the results of the collision position identification, the probability distribution to which the collision position exists may be displayed as a contour line or the like on the racket 12.

2. Second Embodiment

Next, a second embodiment of the present disclosure will be described with reference to FIGS. 15 to 24. In this embodiment, a sensor device is installed in a variety of objects and an analyzing device identifies a position at which a user's finger (second object), for example, touches the object (first object).

(2-1. Entire Configuration)

Figure 15:
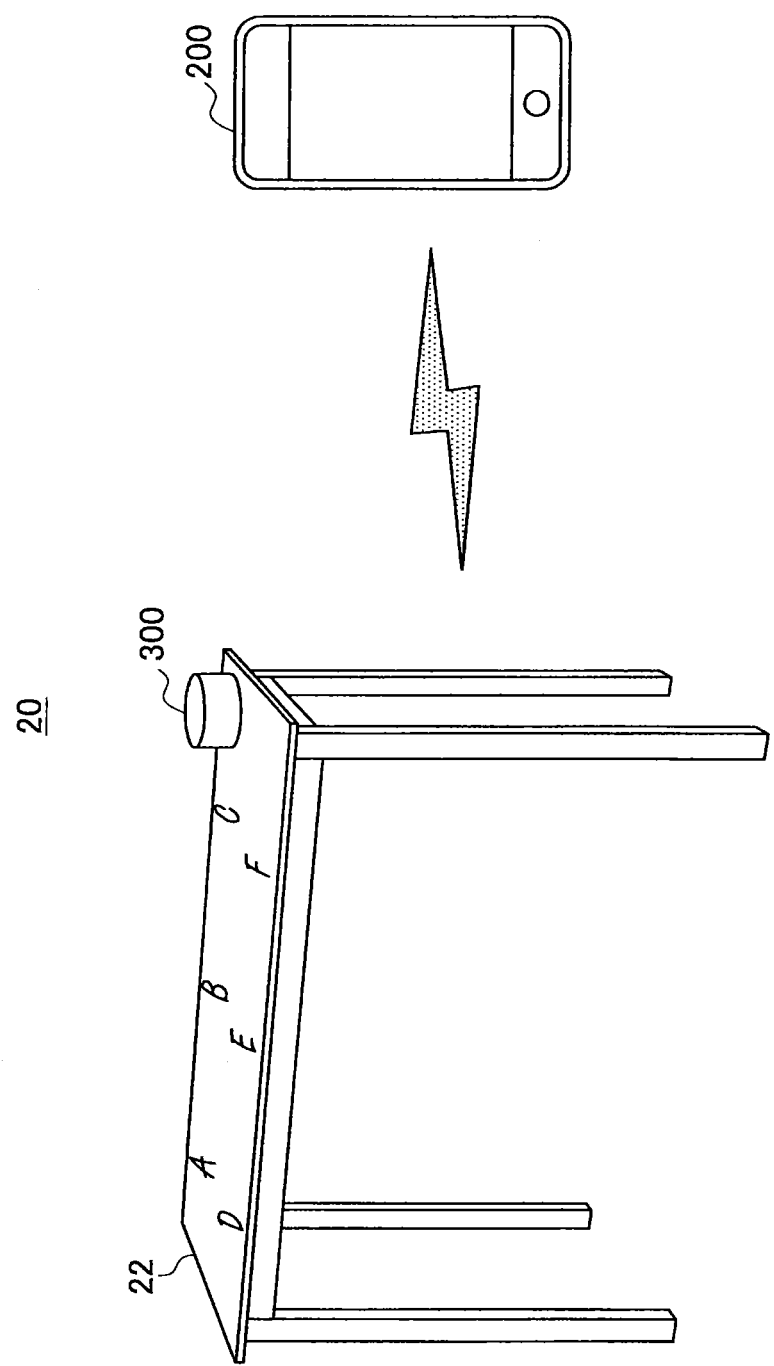
FIG. 15 is a figure showing an entire configuration of a second embodiment of the present disclosure.

The entire configuration of the second embodiment of the present disclosure will be described with reference to FIG. 15. FIG. 15 is a figure showing an entire configuration of the second embodiment of the present disclosure.

Referring to FIG. 15, in the second embodiment of the present disclosure, there is provided a system 20 including a sensor device 300 mounted on a table 22 and an analyzing device 200 that communicates with the sensor device 300.

Here, the table 22 is an example of an object that vibrates owing to a user's tap with a finger (collision with the user's finger). In the following description, the description will be given by taking the table 22 as an example of the object (first object); however, the example of the object is not limited to this. As described later, based on vibrations when the user taps the object with a finger, the position on the object at which the user's finger touches is identified. Therefore, this embodiment can be applied to any object as long as the object vibrates with the user's tap. The touching subject (second object) is not limited to the user's finger either, and may be a stylus, a pointer, and the like.

The sensor device 300 is disposed on the table 22, detects vibrations when the user taps a surface of the table 22, and transmits the detection results to the analyzing device 200 as vibration data. The analyzing device 200 analyzes the vibration data received from the sensor device 300 and identifies the position on the table 22 at which the user taps with the finger. Note that, for simplicity, the position on the table 22 at which the user taps with the finger is also simply called a touch position. The results of identification by the analyzing device 200 may be used to select a command that is executed by the analyzing device 200 itself or a device connected to the analyzing device 200.

In the example shown in the figure, characters "A" to "F" are displayed on the table 22. This display may be directly printed on the table 22, written by hand, pasted as stickers, projected, or imprinted, for example. Alternatively, plates shaped as the characters may be disposed on the table 22. In this example, information related to the position of the respective characters displayed on the table 22 is provided to the analyzing device 200 beforehand and stored in memory, for example. Therefore, the analyzing device 200 can identify the touch position on the table 22 and also specify the character that is displayed at a position close to the touch position. Thus, the user can use the system 20 as a character input device by tapping the position corresponding to each character on the table 22. Note that, for simplicity, only six characters are displayed on the table 22 in the figure; however, in reality, more alphabetical characters or numbers constituting a keyboard, for example, may be displayed.

Note that another sensor or an information acquisition means may be added to the system 20 and information obtained from the sensor or the information acquisition means may be combined with the information obtained from the sensor device 300 and the analyzing device 200, thereby acquiring a variety of operation input by the user.

Hereinafter, the configuration of the sensor device 300 will be described in detail. Note that the configuration of the analyzing device 200 and an example of the theory and a process of identifying the touch position of the object are the same as those in the first embodiment, and therefore a detailed description thereof is omitted.

(2-23 Configuration of the Sensor Device)

Figure 16:
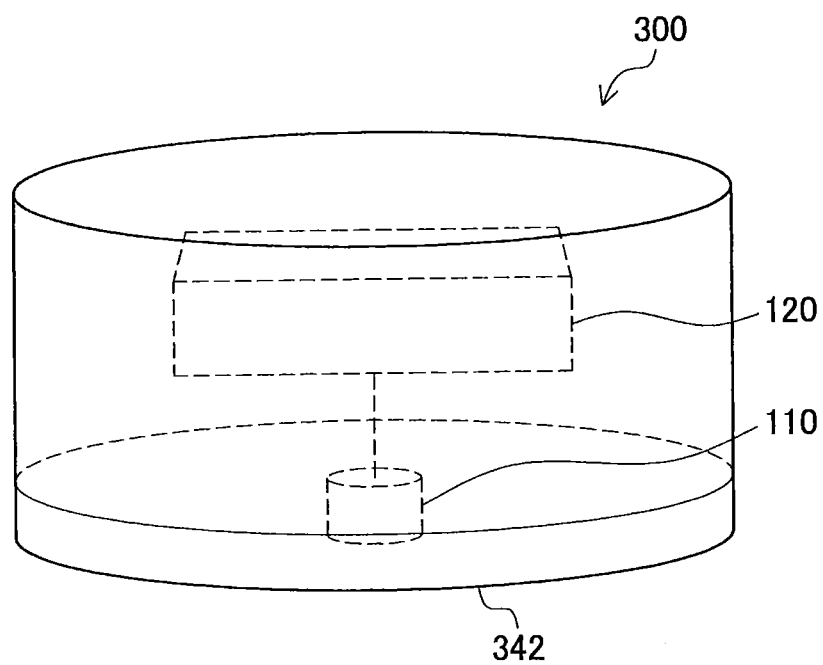
FIG. 16 is a figure showing an example of a configuration of a sensor device according to a second embodiment of the present disclosure.

Next, the configuration of the sensor device according to the second embodiment of the present disclosure will be described with reference to FIG. 16. FIG. 16 is a figure showing an example of the configuration of the sensor device according to the second embodiment of the present disclosure.

Referring to FIG. 16, the sensor device 300 includes the sensor 110, the circuit section 120, and a weight section 342. Note that the sensor 110 and the circuit section 120 are the same structural elements as those in the sensor device 100 in the first embodiment. The circuit section 120 can include the amplifier 122, the communication section 124, the control section 126, and the memory 128 (none is shown in the figure).

The sensor 110 is a sensor that outputs vibration data by detecting vibrations of the table 22. In the example shown in the figure, the sensor device 300 is closely attached to the table 22 by the weight of the weight section 342. Therefore, the sensor 110 included in the sensor device 300 is held in a state where the vibrations in the table 22 are transmitted. The sensor 110 may be closely attached to the table 22 by being disposed to be embedded in the weight section 342 as shown in the figure so as to detect directly the vibrations in the table 22, for example. Alternatively, the sensor 110 may be closely attached to the top surface of the weight section 342, for example, to detect indirectly the vibrations in the table 22 transmitted from the weight section 342.

The amplifier 122, the communication section 124, the control section 126, and the memory 128 included in the circuit section 120 have the same functions as those in the first embodiment, respectively. That is, the vibration data detected by the sensor 110 is amplified by the amplifier 122 as necessary and transmitted to the analyzing device 200 by the communication section 124. The control section 126 controls each section in the sensor device 300. Further, the memory 128 temporarily or permanently stores a variety of data used for the operation of the sensor device 300.

Note that in the example shown in the figure, the sensor device 300 does not include an output section; however, a configuration including the output section is also possible. In this case, the output section can have the same function as the output section 130 of the sensor device 100 in the first embodiment. Information output from the output section 130 can be, for example, information related to the analysis results that the communication section 124 has received from the analyzing device 200. The information related to the analysis results can be, for example, information indicating which character on the table 22 the user has tapped. Alternatively, the information related to the analysis results may be information indicating whether or not the analysis on the touch position has been successful, that is, whether or not the input of character information by the user's tap has been successful. The information can be output according to visual information, voice information, vibrations, or the like.

(2-3. Process Example)

Figure 17:
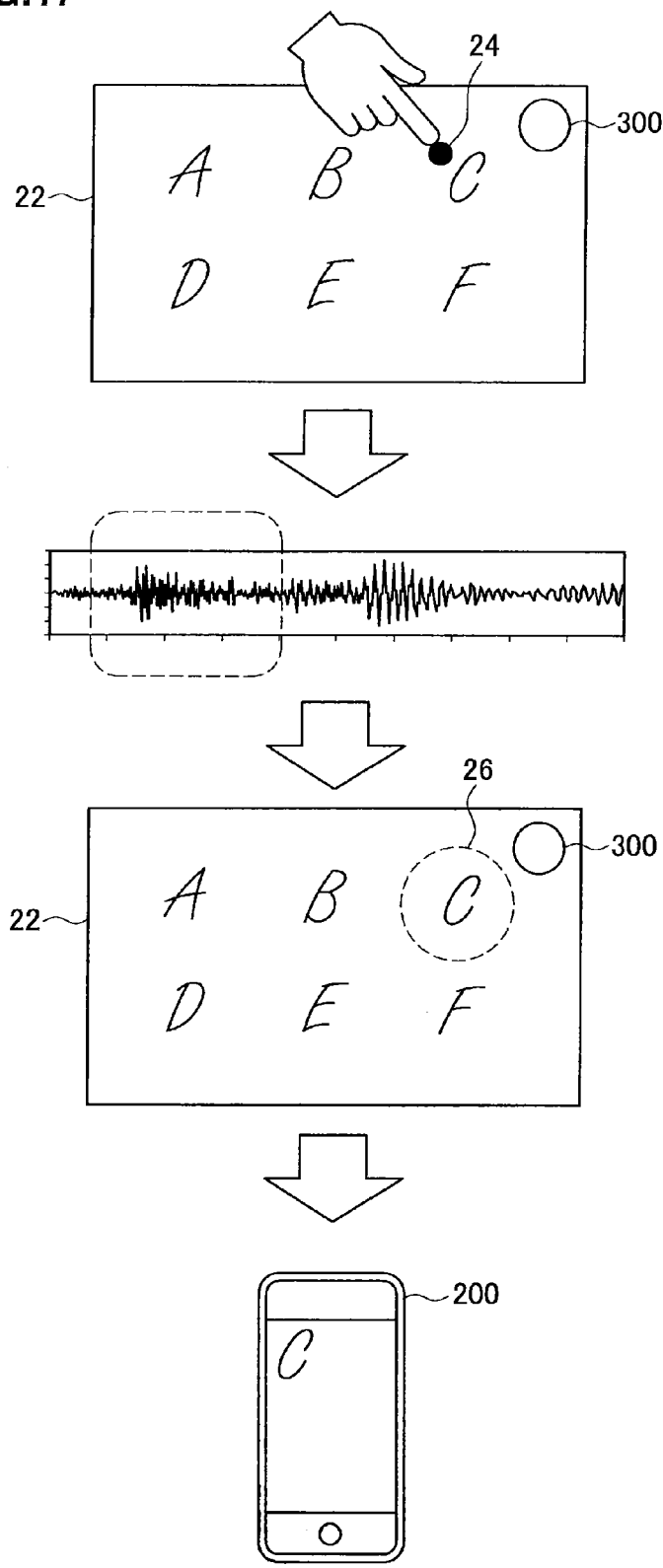
FIG. 17 is a figure schematically showing a process in a second embodiment of the present disclosure.
Figure 18:
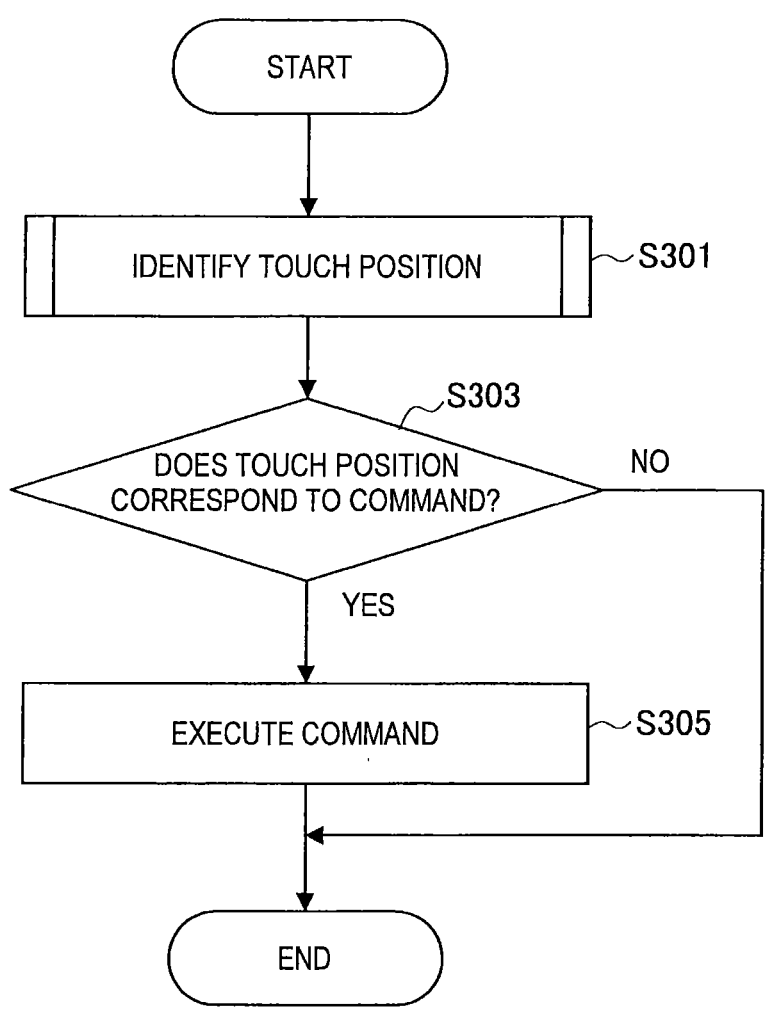
FIG. 18 is a flowchart showing a first example in a process in a second embodiment of the present disclosure.
Figure 19:
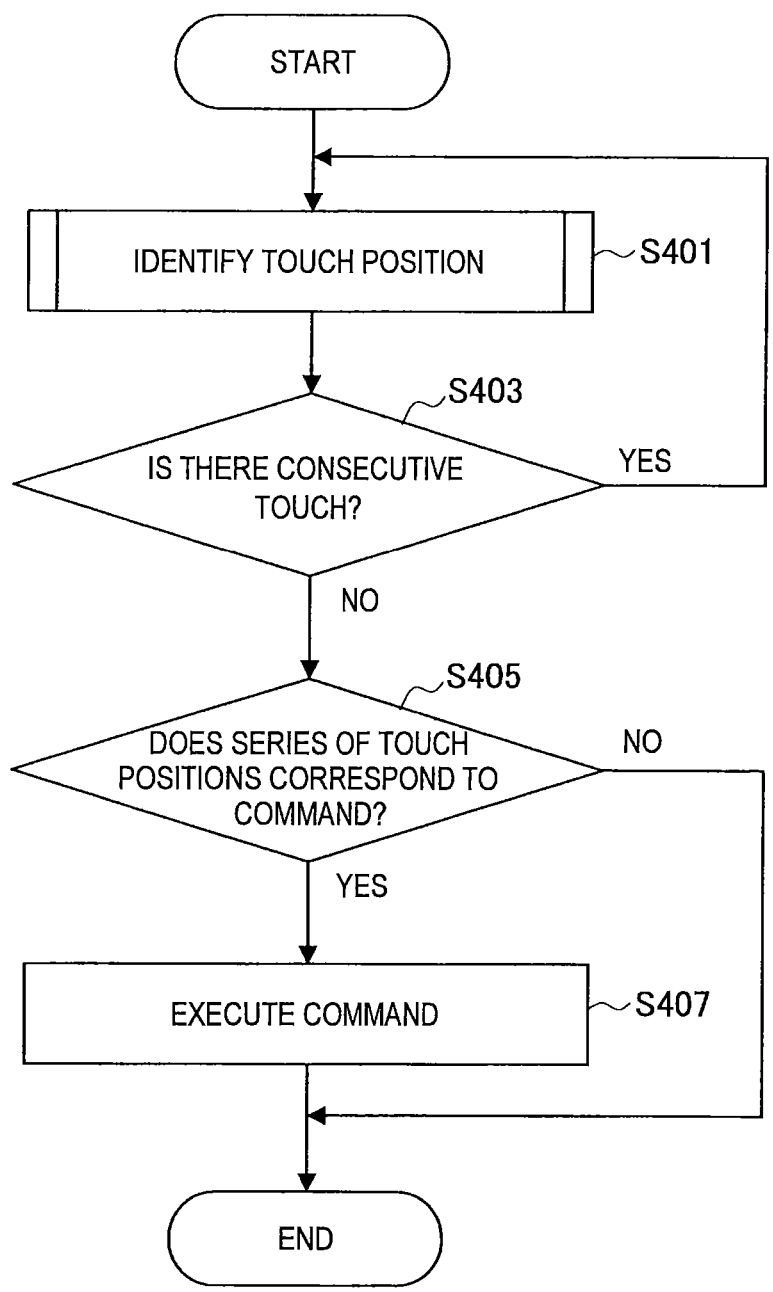
FIG. 19 is a flowchart showing a second example in a process in a second embodiment of the present disclosure.

Next, a process example in the second embodiment of the present disclosure will be described with reference to FIGS. 17 to 19. FIG. 17 is a figure schematically showing a process in the second embodiment of the present disclosure. FIG. 18 is a flowchart showing a first example in the process in the second embodiment of the present disclosure. FIG. 19 is a flowchart showing a second example in the process in the second embodiment of the present disclosure.

Referring to FIG. 17, in this embodiment, vibrations when the user taps a position 24 on the table 22 with a finger or the like are detected by the sensor device 300 and vibration data are transmitted to the analyzing device 200. The analyzing device 200 identifies the position 24 as the touch position of the user through the processes described with reference to FIGS. 7 to 12 in the first embodiment, for example, and specifies a character 26 located near the position 24 as a character that the user inputs by tapping the table 22. Based on the results, the analyzing device 200 may display the character 26 ("C" in this case) on a display section of the analyzing device 200.

This process will be described in more detail in accordance with this embodiment. The positions on the table 22 are defined beforehand at predetermined intervals, and a position group composed of the positions is treated as a candidate for the touch position. For example, the position group may be disposed on the top surface of the table 22 at equal intervals vertically and laterally. Further, at least a part of the position group corresponds to characters displayed on the table 22. Information on the position group and the characters corresponding to the positions included in the position group can be stored beforehand in the memory 210 of the analyzing device 200, for example.

For example, as shown in the figure, in the case where the six characters "A" to "F" are displayed, the respective positions constituting the position group may correspond to the respective characters "A" to "F". In this case, for example, the top surface of the table 22 may be sectioned to six regions in accordance with the positions of the characters "A" to "F", and positions included in the respective regions may correspond to the respective characters. Alternatively, positions within a predetermined distance from the center of each of the characters may correspond to each of the characters and the rest of the positions may not correspond to the characters. In this case, the user's tap on the position that is not able to correspond to the characters may be identified as an invalid input or an input of a space, for example, other than the displayed characters.

Note that, as described above, the characters displayed on the table 22 are not limited to the six characters; more characters, numbers, or symbols may be displayed and positions on the table 22 which correspond to these may be defined beforehand. Further, the place where the positions are defined beforehand is not limited to the top surface of the table 22, and positions may be defined on a side surface or a bottom surface of the table 22, or a leg portion thereof, for example.

For each of the positions that are defined beforehand in the above manner, vibrations detected by the sensor device 300 in the case where a tap with a user's finger or the like is given as an input signal are measured beforehand. Further, based on the vibrations measured here, a transmission function for each position is calculated. The analyzing device 200 identifies the touch position on the table 22 based on the vibration data received from the sensor device 300 by using the transmission function that is calculated beforehand in this manner. Further, the analyzing device 200 specifies a command to input the character corresponding to the position that is identified as the touch position as a command to execute, for example. By executing this command in the analyzing device itself or transmitting this command to an external device through the communication section 202, it is possible to realize the input of the character with the user's tap on the character displayed on the table 22.

First, in the case where the input is performed by the tap with the user's finger, for example, and the input signal has characteristics different from those of the impulse signal, the identification of the touch position may be performed by the process in the first process example described with reference to FIG. 11 in the first embodiment. Second, in the case where the input is performed by the tap with a stylus or a pointer, for example, and the input signal has characteristics similar to those of the impulse signal, the process in the second process example described with reference to FIG. 12 in the first embodiment may be performed.

First Example

In a first example shown FIG. 18, the identification section 206 of the analyzing device 200 identifies the touch position (step S301) and then determines whether or not the touch position corresponds to a command that has been registered beforehand (step S303). For example, in the example shown in FIG. 17, the determination here can be the determination whether or not a character or the like that corresponds to the touch position exists. Here, in the case where the character corresponding to the touch position exists, the touch position corresponds to a command to "input a character". Further, as described above, in the case where a touch on a region that is away from any of the characters is identified as an input of a space or the like, the position included in the region corresponds to a command to "input a space", for example.

In step S303, in the case where the identified touch position corresponds to the command, the identification section 206 executes the command (step S305). The execution of the command here can include a variety of operations without limitation to an input of a character. For example, the identification section 206 may execute a command to output information from the output section 212. Alternatively, the identification section 206 may transmit the command to an external device through the communication section 202 instead of executing the command in the identification section 206. For example, in the example of the input of the character shown in FIG. 17, the command of the input of the character may be transmitted to another device such as a PC from the communication section 202.

Second Example

In a second example shown in FIG. 19, the identification section 206 of the analyzing device 200 identifies the touch position (step S401), and then identifies whether or not there is a consecutive touch (step S403). In the case where there is a consecutive touch, the identification section 206 also identifies the touch position of the consecutive touch (step S401).

In the case where it is determined in step S403 that there is no consecutive touch, that is, a series of touches is completed, the identification section 206 determines whether or not a series of touch positions corresponds to a command that has been registered beforehand (step S405). For example, in the example of the input of the character shown in FIG. 17, a command may correspond to a character string indicated by the series of touch positions, for example, in the order of "F", "E", "E", and "D". Further, even in the case where characters are not displayed on the table 22, for example, a command may correspond to "taps on a specific position predetermined number of times".

In step S405, in the case where the series of touch positions correspond to a command, the identification section 206 executes the command (step s407). Here again, in a manner similar to that of the first example, the analyzing device 200 itself may execute the command by using the output section 212 or the like, or the command may be transmitted to an external device through the communication section 202.

(2-4. Modification Example)

Figure 20:
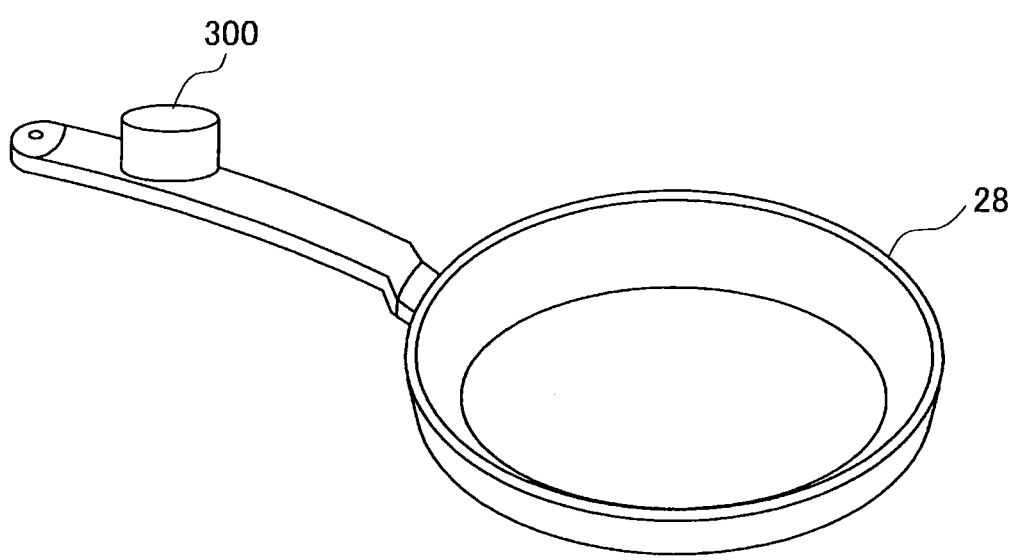
FIG. 20 is a figure showing a first modification example in a second embodiment of the present disclosure.
Figure 21:
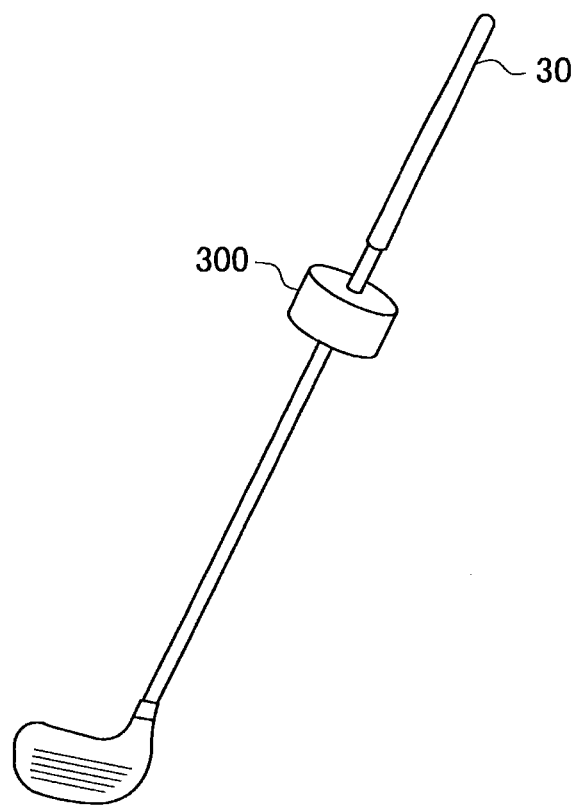
FIG. 21 is a figure showing a second modification example in a second embodiment of the present disclosure.
Figure 22:
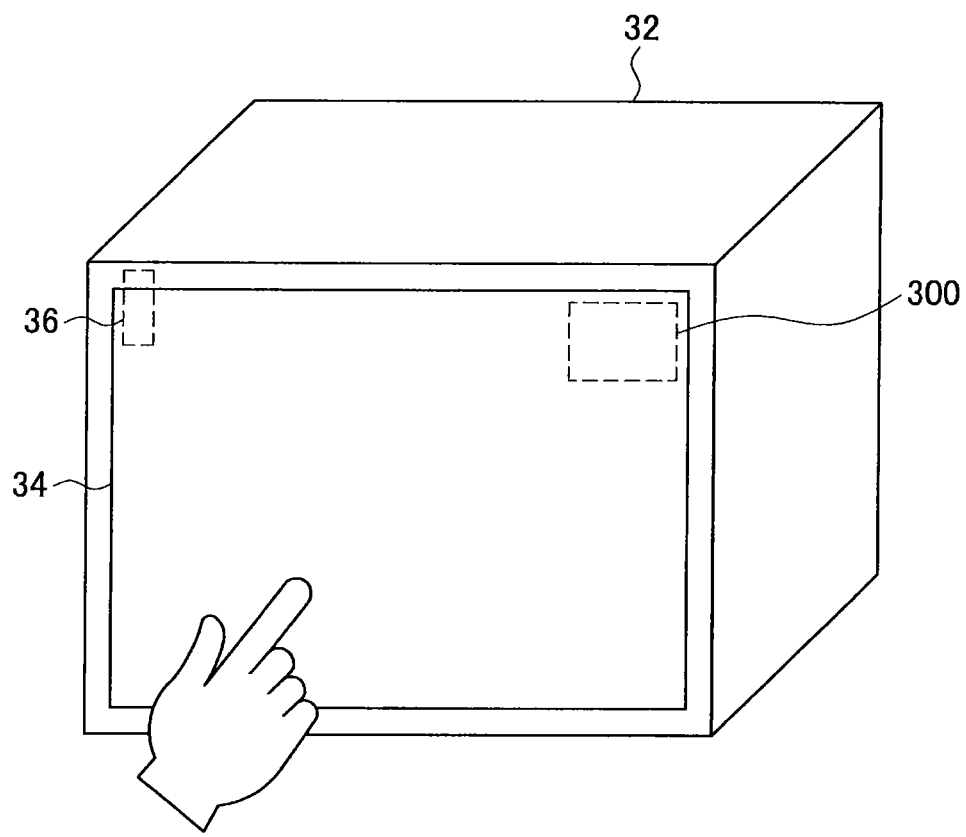
FIG. 22 is a figure showing a third modification example in a second embodiment of the present disclosure.
Figure 23:
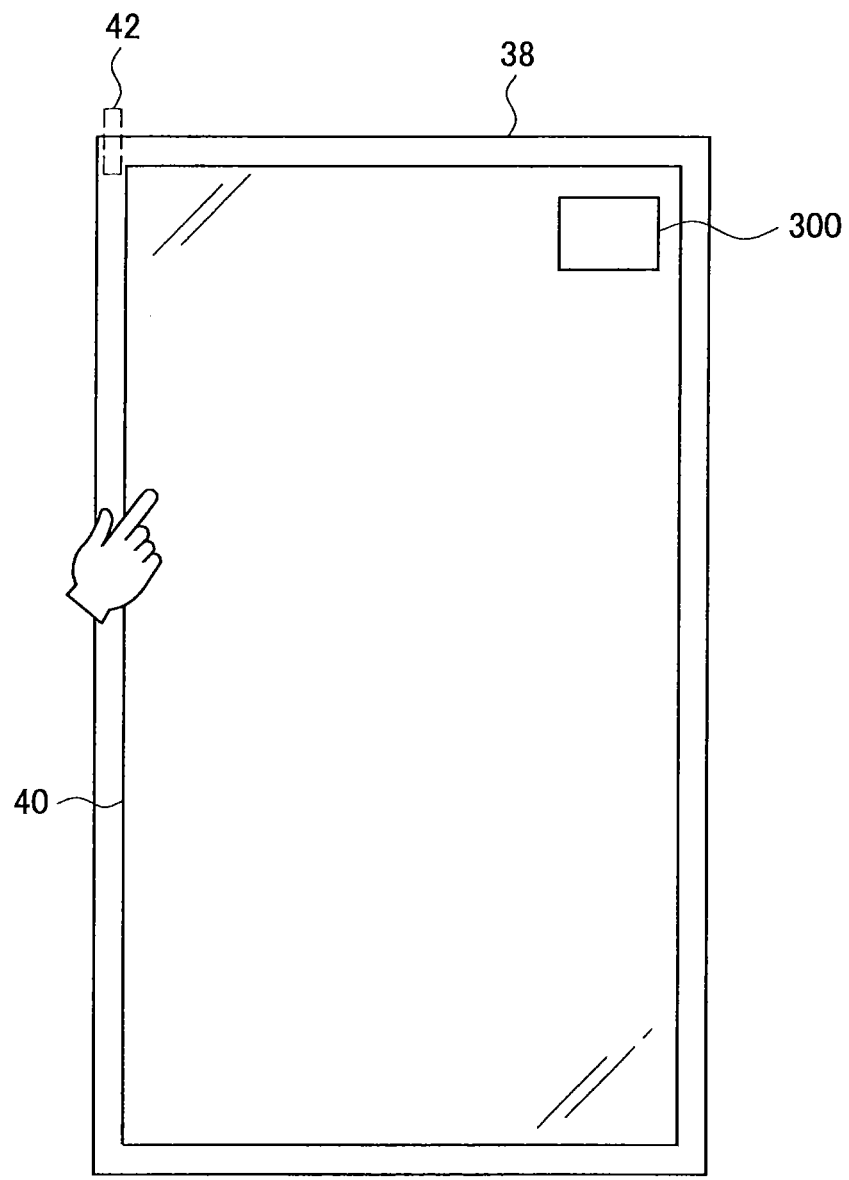
FIG. 23 is a figure showing a fourth modification example in a second embodiment of the present disclosure.
Figure 24:
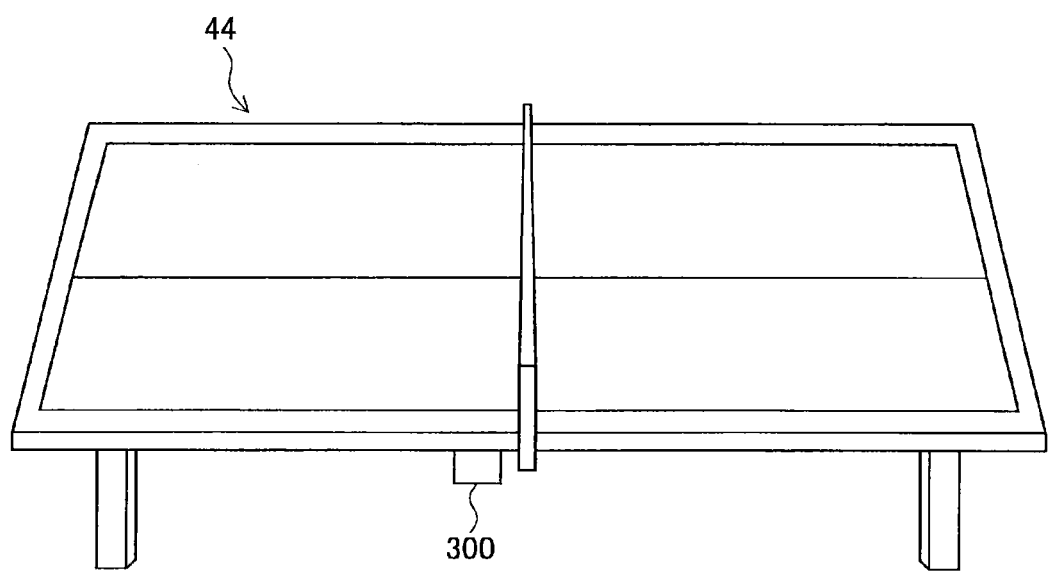
FIG. 24 is a figure showing a fifth modification example in a second embodiment of the present disclosure.

Next, modification examples of the second embodiment of the present disclosure will be described with reference to FIGS. 20 to 24. FIG. 20 is a figure showing a first modification example in the second embodiment of the present disclosure. FIG. 21 is a figure showing a second modification example in the second embodiment of the present disclosure. FIG. 22 is a figure showing a third modification example in the second embodiment of the present disclosure. FIG. 23 is a figure showing a fourth modification example in the second embodiment of the present disclosure. FIG. 24 is a figure showing a fifth modification example in the second embodiment of the present disclosure.

In the first modification example shown in FIG. 20, the sensor device 300 is mounted on a grip portion of a frying pan 28. The sensor device 300 includes a magnet instead of the weight section 342 in the example of FIG. 16, for example, and the magnet is attached to the grip portion of the frying pan 28 made of a magnetic material such as metal, thereby holding the sensor 110 in a state where vibrations in the frying pan 28 are transmitted. For example, a certain command (e.g., operation of a PC installed in the kitchen or operation of cooking equipment such as the gas stove) may be registered to correspond to each section of the frying pan 28, so that a user can cause a device or equipment to execute the desired command without being bothered by filthy hands while working, by tapping the position corresponding to the command with a finer, a cooking tool, or the like. A similar configuration can be applied to another cooking tool such as a knife or a cutting board, a tool such as a wrench or a hammer, and the like.

In the second modification example shown in FIG. 21, the sensor device 300 is mounted on a rod portion of a golf club 30. The sensor device 300 has a rubber band instead of the weight section 342 in the example of FIG. 16, for example, and the rubber band is wound around the rod portion of the golf club 30, thereby holding the sensor 110 in a state where vibrations in the golf club 30 are transmitted. Alternatively, the sensor device 300 may include a clip instead of the weight portion 342, and the clip may pinch the rod portion of the golf club 30. By using the rubber band or the clip in this manner, the sensor 300 can be mounted stably on an object in which vibrations are strong.

In the present modification example, for example, a certain command (e.g., operation of equipment in a golf practice range or operation of a recording device that records a user to play) may be registered to correspond to each section of the golf club 30, so that a user can cause a device or equipment to execute the desired command without stopping the play by tapping the position corresponding to the command with a finger or the like. Thereby, the user can also start recording a video or execute an operation of adding meta information, for example, during the play. Further, as in the first embodiment, it is also possible to identify the position a ball has collided with, from vibrations detected by the sensor device 300, by using a head portion of the golf club 30.

Further, the above two kinds of functions may be combined with each other. For example, in the case where a ball is hit by the head portion of the golf club 30, the position the ball has collided with may be detected, and in other cases, for example, in the case where the rod or a grip is tapped, a predetermined command may be executed. In this case, according to the position, vibrations detected by the sensor device 300 are measured beforehand in the case where either or both of two kinds of input signals, which are collision of a ball and a tap by a user, for example, is given. The configuration of the present modification example can be applied to, without limitation to the golf club 30, the racket 12 described in the first embodiment or a striking tool used for all other types of sports.

In the third modification example shown in FIG. 22, the sensor device 300 is attached to a door 34 of a safe 32 by using a bolt or an adhesive, for example. The bolt, adhesive, and the like make the sensor device 300 closely attached to the door 34, thereby holding the sensor 110 in a state where vibrations in the door 34 are transmitted. For example, a predetermined pattern can be formed by the position or frequency of taps on the door 43, and a command to unlock/lock a lock 36 of the safe 32 can be registered to correspond to the pattern, so that a user can unlock/lock the safe 32 by tapping the door 34. Note that in the case where the door 34 is closed and is closely attached to a main body of the safe 32 and the door 34 and the main body vibrate together, the sensor device 300 may be attached to the main body of the safe 32.

Thus, it is unnecessary to dispose a switch, dial, or the like on the surface of the door 34, and even in the case where the outside of the safe 32 becomes extremely high temperatures, for example, the entry of heat to the inside can be prevented. The same advantage can be obtained in the case where the sensor device 300 is attached to a surface of a door of a space ship or a submarine, for example. This is because it is preferable that components arranged on the surface of the door that will be exposed to a cruel environment, such as high temperatures, low temperatures, high pressures, and low pressures, be a few. Further, a physical key is not exposed on the surface of the door, so that it becomes quite difficult to break the key, which increases the security. From this point of view, it is also useful to attach the sensor device 300 to a door of a residence or the like and to register a command to unlock to correspond to a pattern of tapping the door.

In the fourth modification example shown in FIG. 23, the sensor device 300 is attached to a glass portion 40 of a glass window 38 by using an adhesive or a sucker, for example. The adhesive, sucker, and the like make the sensor device 300 closely attached to the glass portion 40, thereby holding the sensor 110 in a state where vibrations in the glass portion 40 are transmitted. For example, a predetermined pattern can be formed by the position or frequency of taps on the glass portion 40, and a command to unlock/lock a lock 42 of the glass window 38 can be registered to correspond to the pattern, so that a user can unlock/lock the glass window 38 by tapping the glass portion 40. Note that in the case where the glass portion 40 and a peripheral window frame portion vibrate together, the sensor device 300 may be attached to the window frame portion.

Thus, it is possible to identify the touch position on the glass portion 40 of a user and to execute the command corresponding to the identified touch position while the transparency of the glass portion 40 is secured. The same function can be realized by disposing a touch panel including a transparent electrode in the glass portion 40 or by disposing a plurality of sensors on the periphery of the glass portion 40, for example. However, according to the present modification example, since the touch position can be detected by disposing the single sensor device 300 on the glass portion 40 or the like, the above function can be realized with a simple device configuration at low cost. Note that the same configuration can be applied to the case where a surface that is required to be transparent is used as an input section in a given device such as a television, for example. In the case of a television, for example, it is possible to execute a variety of commands such as selection of channels and adjustment of volume by tapping a given position on a screen.

In the fifth example shown in FIG. 24, the sensor device 300 is attached to a table tennis table 44 by using an adhesive, bolt, sucker, or the like, for example. The adhesive, bolt, sucker, or the like makes the sensor device 300 closely attached to the table tennis table 44, thereby holding the sensor 110 in a state where vibrations in the table tennis table 44 are transmitted. For example, by measuring vibrations beforehand that are detected by the sensor device 300 in the case where a ball of table tennis falls into a position within each court, it is possible to identify which court a ball has fallen into in a match of table tennis played with the table tennis table 44. In this case, for example, by setting a command to add a point to one team in the case where the ball falls into a court of the other team, it is possible to automatically calculate the points in a match of table tennis.

A variety of modification examples other than the above examples described with reference to the figures are possible in this embodiment. For example, it is relatively common to attach a microphone on an outer side of a body of a woodwind such as a classic guitar or a violin; however, it is difficult to embed an electric component such as a button or a knob because the body would be wounded. Thus, by attaching the sensor device 300 to a surface of the body by using a clip or the like and setting beforehand a variety of commands corresponding to the positions on the body a user taps, it is possible to adjust the volume or sound quality or to output additional sound during the play without wounding the body.

Further, for example, in the case where a dance game or the like is played at home, it has been necessary to spread a dedicated sheet incorporating buttons to play the game thereon. However, if the sensor device 300 is installed on the floor and the positions of steps of a player are determined on the basis of the position of the sensor device 300, it becomes possible to play such a game without spreading the dedicated sheet.

Further, for example, an acceleration sensor that is loaded in a variety of electronic devices such as smartphones can acquire the vibration data in the same manner as the sensor 110 in the sensor device 300 by increasing the sampling frequency. With this, it is possible to identify the position on a surface of a smartphone at which a user taps, and in the case where a pattern of the position, frequency, and the like of taps corresponds to a predetermined pattern, the smartphone can be unlocked. In this case, the smartphone corresponds to a device that has both functions of the sensor device and the analyzing device in this embodiment.

Further, for example, the sensor device 300 may be mounted on an object such as a natural stone or a block of wood, and vibrations generated when a user taps a predetermined position the object may be used as information that corresponds to a certain key. Since each object has inherent vibration characteristics, by using the vibration characteristics as a part of information that corresponds to the key, it becomes difficult to copy the key, which will increase the security.

As described above, the vibration characteristics are inherent in each object. Therefore, if there are objects having substantially the same structure, the vibration characteristics thereof are substantially the same. Accordingly, in the case where, for example, the structure of an object (first object) on which the sensor device 300 is to be mounted is known because it is a standardized industrial product or the like and the sensor device 300 is to be mounted on a specified position beforehand, the vibration characteristics of the object can be given as known data by using data measured by mounting the sensor device 300 on the same position of the same product, for example. In this manner, it is possible to omit a procedure of calibration in which vibrations in the case where a user touches each position after the sensor device 300 is mounted on the object are measured.

In this case, the object may be specified by an input of a model number, for example, or may be specified by object recognition based on an image captured by a camera incorporated in an HMD (Head Mounted Display) or the like. In the case where the object is specified by the object recognition, when the sensor device 300 is in the image, it is also possible to specify the mounting position of the sensor device 300.

3. Third Embodiment

Next, a third embodiment of the present disclosure will be described. In the first embodiment and the second embodiment, examples in which a touch subject (second object) touches an object (first object) that stands still and on which a sensor device is mounted have been described. In this case, the "touch" of the second object to the first object generates vibrations in the first object, that is, "collision". However, embodiments of the present disclosure are not limited to the "collision" of the second object with the first object in this manner, and can be applied to a case where a more general "touch" is performed.

In this embodiment, the first object vibrates with a predetermined vibration pattern. These vibrations are weak vibrations applied with a stationary pattern, for example, and can be applied by an excitation section such as a vibrator included in a sensor device. The vibrations with the predetermined vibration pattern in the first object are a kind of white noise. The sensor device provided for the first object detects how the vibrations with the predetermined vibration pattern are changed by a touch of the second object.

Since the transmission function of vibration differs depending on the position of an object, in the case where another object (second object) touches any of positions on a vibrating object (first object), changes in vibration states in the object differ depending on the touch position. By using this nature, by making the first object vibrate, even in the case where the touch of the second object is soft, the touch position can be detected.

In this embodiment, the second object may not be separated from the first object by bouncing back after touching the first object and may keep the touched state. When the second object moves while keeping the touched state with the first object, if the change in the vibration state of the first object by the touch of the second object is calculated in chronological order, operation information such as a so-called drag operation can be acquired.

Further, if there is a time lag between two touches (first/second touches), by comparing vibration states of the object before and after the first touch and further comparing vibration states of the object before and after the second touch, the two touch positions can each be detected. Thus, it becomes possible to acquire operation information such as pinch-in/out.

4. Fourth Embodiment

Next, a fourth embodiment of the present disclosure will be described. In this embodiment, the second object vibrates with a predetermined vibration pattern. These vibrations are, similarly to the vibrations in the first object in the third embodiment above, weak vibrations applied with a stationary pattern, for example. For example, if the second object is a tool such as a stylus, by incorporating a vibrator or the like in the tool, vibrations can be applied. Further, for example, if the second object is a user's finger, a user wears a tool in a form of a wristwatch, and a vibrator or the like incorporated therein applies vibrations.

In the case where the second object is vibrating, even in the case where the second object touches the first object softly, vibrations are generated in the first object. Since the transmission function of vibration differ depending on the position of an object, in the case where, for example, a vibrating user's finger or the like (second object) touches a position of a still object (first object), the change in vibrations in a process of transmission by the sensor device 300 differs depending on the touch position. By using this nature, by making the vibrating second object touch the first object, even in the case where the second object touches the first object softly, the touch position can be detected. Note that in this embodiment, in a manner similar to that in the third embodiment above, it is also possible to acquire operation information such as a drag operation and pinch-in/out.

Further, in the case where the vibrations in the second object are vibrations with an inherent pattern, in addition to the touch position, this vibration pattern itself can correspond to a command. For example, in the case of the example of the safe 32 described with reference to FIG. 22, application of vibrations with a predetermined pattern to a predetermined position on the door 34 can correspond to a command to unlock. In this case, vibrations with the predetermined pattern can be, for example, generated by a vibrator that is made as a key to the safe 32. This vibrator may directly touch the door 34 or a user's finger wearing this vibrator (in a form of a wristwatch, for example) may touch the door 34.

5. Supplement

Hardware Configuration

Figure 25:
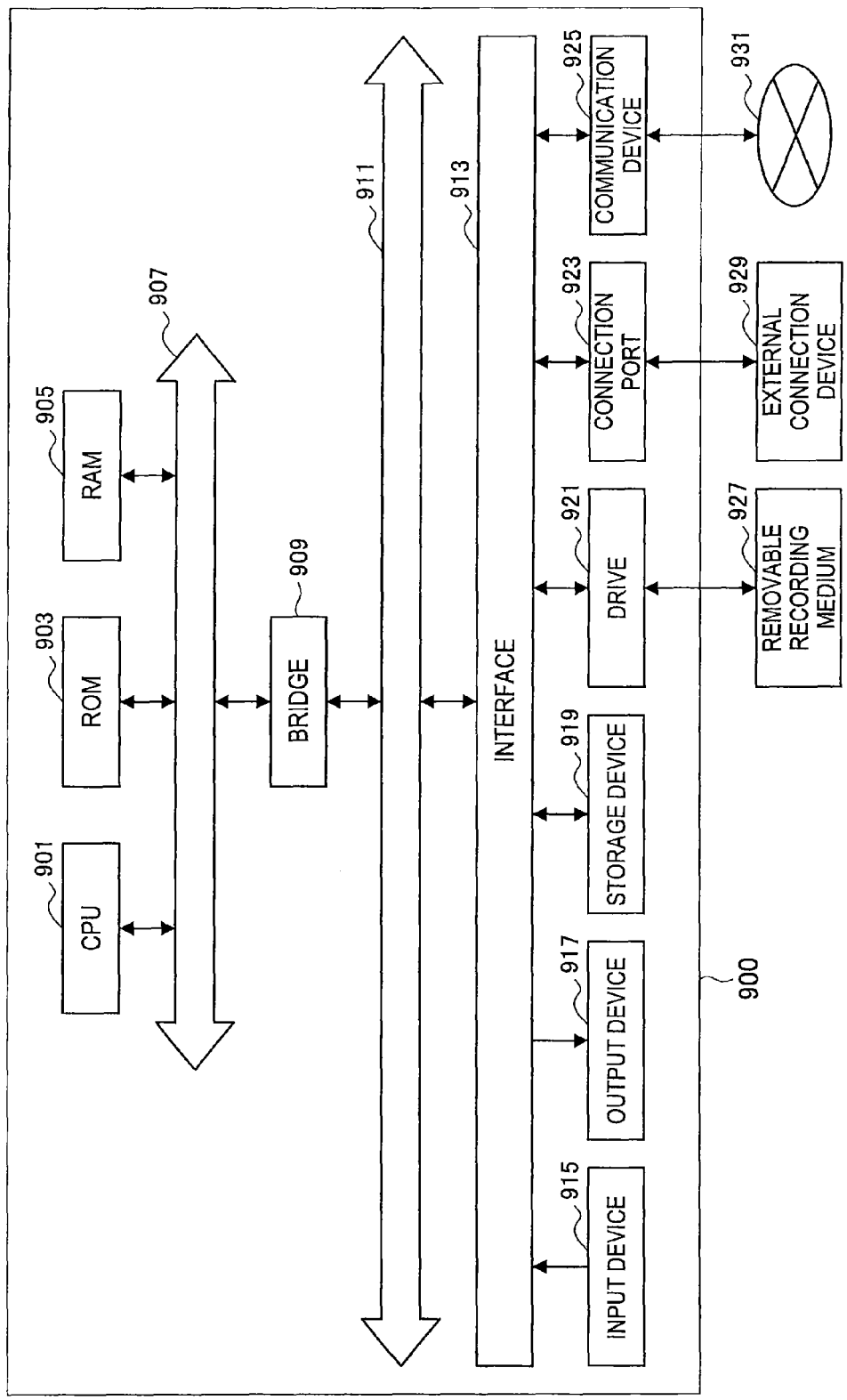
FIG. 25 is a block diagram for describing a hardware configuration of an information processing apparatus.

A hardware configuration of an information processing apparatus 900, which realize the analyzing device 200 according to each of the above-described embodiments of the present disclosure, will be described by referring to FIG. 25. FIG. 25 is a block diagram for describing a hardware configuration of an information processing apparatus.

The information processing apparatus 900 includes a CPU 901, ROM 903, and RAM 905. In addition, the information processing apparatus 900 may include a host bus 907, a bridge 909, an external bus 911, an interface 913, an input device 915, an output device 917, a storage device 919, a drive 921, a connection port 923, and a communication device 925.

The CPU 901 functions as an arithmetic processing apparatus and a control apparatus, and controls all or part of the operations within the information processing apparatus 900, according to various programs stored in the ROM 903, the RAM 905, the storage device 919, or a removable recording medium 927. The ROM 903 stores programs and arithmetic parameters used by the CPU 901. The RAM 905 primarily stores programs used for the execution of the CPU 901 and parameters modified for these executions as appropriate. The CPU 901, the ROM 903, and the RAM 905 are mutually connected by the host bus 907, which is configured by an internal bus such as a CPU bus. In addition, the host bus 907 is connected to the external bus 911, which is a PCI (Peripheral Component Interconnect/Interface) bus or the like, through the bridge 909.

The input device 915 is, for example, an apparatus which is operated by the user, such as a mouse, keyboard, touch panel, button, switch, lever, or the like. The input device 915, for example, may be a remote controlled apparatus which uses infrared rays or other electronic waves, and may be an external connection device 929, such as a mobile phone, corresponding to the operations of the information processing apparatus 900. The input device 915 includes an input control circuit which generates an input signal based on information input by the user, and outputs the input signal to the CPU 901. The user inputs various data and instructs the process operations for the information processing apparatus 900, by operating this input device 915.

The output device 917 includes an apparatus that can notify the acquired information visually or orally to the user. The output device 917, for example, may be a display device such as an LCD (Liquid Crystal Display), a PDP (Plasma Display Panel), or an organic EL (Electro-Luminescence) display, may be a voice output apparatus such as speakers or headphones, or may be a printer apparatus. The output device 917 may output the results obtained by the information processing apparatus 900 as an image, such as text or a picture, or may output the results as a sound such as a voice or noise.

The storage device 919 is an apparatus for data storage which is included as an example of a storage section of the information processing apparatus 900. The storage device 919, for example, includes a magnetic storage device such as a HDD (Hard Disk Drive), a semiconductor storage device, an optical storage device, or a magneto-optical storage device. The storage device 919 stores programs and various data executed by the CPU 901, and various data obtained from the outside.

The drive 921 is a reader/writer for the removable recording medium 927, such as a magnetic disk, an optical disk, a magneto-optical disk, or a semiconductor memory, and is built into the information processing apparatus 900 or is externally attached. The drive 921 reads out information recorded in the mounted removable recording medium 927, and outputs the information to the RAM 905. Further, the drive 921 writes a record onto the mounted removable recording medium 927.

The connection port 923 is a port for connecting equipment directly to the information processing apparatus 900. The connection port 923, for example, may be a USB (Universal Serial Bus) port, an IEEE 1394 port, an SCSI (Small Computer System Interface) port, or the like. Further, the connection port 923 may be an RS-232C port, an optical audio terminal, an HDMI (High-Definition Multimedia Interface) port, or the like. Various data may be exchanged between the information processing apparatus 900 and the external connection device 929, by connecting the external connection device 929 to the connection port 923.

The communication device 925, for example, is a communication interface configured by a communication device or the like for connecting to a communication network 931. The communication device 925, for example, may be a communication card for wired or wireless LAN (Local Area Network), Bluetooth (registered trademark), or WUSB (Wireless USB). Further, the communication device 925 may be a router for optical communication, a router for an ADSL (Asymmetric Digital Subscriber Line), or a modem for various types of communication. The communication device 925, for example, sends and receives signals or the like using the Internet or a prescribed protocol such as TCP/IP, with other communication devices. Further, the communication network 931 connected to the communication device 925 is a network connected by wires or wirelessly, and for example is the Internet, a home LAN, infrared communications, radio wave communications, or satellite communications.

Heretofore, an example of a hardware configuration of the information processing apparatus 900 has been shown. Each of the above structural elements may be configured by using general purpose members, and may be configured by hardware specialized in the functions of each structural element. Such a configuration may be modified as appropriate according to the technology level of the time when it is performed.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1) A sensor device including:
 a sensor configured to output a vibration datum by detecting a change in a state of a vibration in a first object when a second object touches the first object;
 a holding section configured to hold, at a portion of the first object which is different from a portion where the second object touches, the sensor in a state where the vibration in the first object is transmitted; and
 a communication section configured to transmit the single vibration datum detected by the sensor to an analyzing device which identifies a touch position where the second object touches the first object by analyzing the vibration datum.

(2) The sensor device according to (1),
 wherein the sensor outputs the vibration datum by detecting the vibration generated in the first object when the second object collides with the first object.

(3) The sensor device according to (2),
 wherein the first object is a striking tool, and
 wherein the second object is a hit object which collides with the striking tool.

(4) The sensor device according to (1),
 wherein the sensor outputs the vibration datum by detecting the change in the state of the vibration in the first object, the change being generated by a touch of the second object to the first object which vibrates with a predetermined pattern.

(5) The sensor device according to (4), further including:
 an excitation section configured to add a vibration with the predetermined vibration pattern to the first object.

(6) The sensor device according to any one of (1) to (5), further including:
 an output section configured to present information to a user,
 wherein the communication section receives information related to the touch position from the analyzing device, and
 wherein the output section presents the information related to the touch position to the user.

(7) An analyzing device including:
 a communication section configured to receive a single vibration datum obtained by detection of a change in a state of a vibration in a first object when a second object touches the first object, the detection being performed by a sensor held at a portion of the first object which is different from a portion where the second object touches, in a state where the vibration in the first object is transmitted; and
 an identification section configured to identify a touch position where the second object touches the first object by comparing a vibration characteristic of the vibration datum and a vibration characteristic for each position of the first object where the second object touches.

(8) The analyzing device according to (7),
 wherein the communication section receives the vibration datum obtained by detection of, performed by the sensor, the vibration generated in the first object when the second object collides with the first object, and
 wherein the identification section identifies a collision position where the second object collides with the first object.

(9) The analyzing device according to (8),
wherein the first object is a striking tool, and
wherein the second object is a hit object which collides with the striking tool.

(10) The analyzing device according to (9), further including:
an output section which presents information related to the collision position to a user.

(11) The analyzing device according to (10),
wherein the output section presents a list which shows positions in an order of a highest probability that a position is the collision position to the user.

(12) The analyzing device according to (10),
wherein the output section presents a map which shows the collision position to the user.

(13) The analyzing device according to any one of (9) to (12),
wherein the sensor is mounted on either a front surface or a rear surface of the striking tool which has the front surface and the rear surface, and
wherein the identification section identifies whether the collision position was on the front surface or the rear surface of the striking tool.

(14) The analyzing device according to any one of (9) to (13),
wherein the sensor is mounted on either a left side or a right side of the striking tool which has a laterally symmetrical shape, and
wherein the identification section identifies whether the collision position was on the left side or the right side of the striking tool.

(15) The analyzing device according to (7),
wherein the communication section receives the vibration datum obtained by the detection of, performed by the sensor, the change in the vibration state in the first object, which is generated by a touch of the second object to the first object which vibrates with a predetermined vibration pattern.

(16) The analyzing device according to any one of (7) to (15), further including:
a storage section configured to store a vibration characteristic for each position in a position group set in a portion of the first object where the second object touches,
wherein the identification section identifies the touch position as one or a plurality of positions in the position group.

(17) The analyzing device according to (16),
wherein the storage section stores a command corresponding to at least a part of the position in the position group, and
wherein the identification section specifies the command corresponding to the identified touch position.

(18) The analyzing device according to (17),
wherein the communication section transmits the specified command to an external device.

(19) The analyzing device according to (16),
wherein the storage section stores a command corresponding to a pattern of combination of predetermined positions in the position group, and
wherein the identification section specifies the command corresponding to the pattern including the identified touch position.

(20) A recording medium having a program recorded thereon, the program causing a computer to execute:
a function of receiving a single vibration datum obtained by detection of a change in a state of a vibration in a first object when a second object touches the first object, the detection being performed by a sensor held at a portion of the first object which is different from a portion where the second object touches, in a state where the vibration in the first object is transmitted; and
a function of identifying a touch position where the second object touches the first object by comparing a vibration characteristic of the vibration datum and a vibration characteristic for each position of the first object where the second object touches.

REFERENCE SIGNS LIST 10, 20 system
12 racket
12s shaft part
12g grip part
14 ball
22 table
28 frying pan
30 golf club
32 safe
38 glass window
44 table tennis table
100, 300 sensor device
110 sensor
120 circuit section
122 amplifier
124 communication section
126 control section
128 memory
130 output section
142 belt
144 casing
200 analyzing device
202 communication section
204 analyzing section
206 identification section
208 database
210 memory
212 output section
342 weight section

The invention claimed is:
1. A sensor device comprising:
a sensor configured to output a vibration datum by detecting a change in a state of a vibration in a first object having a first surface and a second surface when a second object touches the first object;
a holding section configured to hold, at a portion of the first object which is different from a portion where the second object touches, the sensor in a state where the vibration in the first object is transmitted; and
a circuitry configured to transmit the vibration datum detected by the sensor to a circuitry configured to identify a touch position where the second object touches the first object by analyzing the vibration datum,
wherein the circuitry configured to identify the touch position identifies when the touch position is on the first surface of the first object, and
wherein the circuitry configured to identify the touch position identifies when the touch position is on the second surface of the first object.

2. The sensor device according to claim 1, further comprising:
an output device for presenting information to a user,
wherein the circuitry configured to transmit the single vibration datum receives information related to the touch position from the circuitry configured to identify the touch position, and
wherein the output device presents the information related to the touch position to the user.

3. The sensor device according to claim 1,
wherein the sensor outputs the vibration datum by detecting the vibration generated in the first object when the second object touches the first object.

4. The sensor device according to claim 3,
wherein the first object is a striking tool, and
wherein the second object is a hit object which touches the striking tool.

5. The sensor device according to claim 1,
wherein the sensor outputs the vibration datum by detecting the change in the state of the vibration in the first object, the change being generated by a touch of the second object to the first object which vibrates with a predetermined pattern.

6. The sensor device according to claim 5, further comprising:
a vibrator within the sensor for adding a vibration with the predetermined vibration pattern to the first object.

7. An analyzing device comprising:
a circuitry configured to receive a vibration datum obtained by detection of a change in a state of a vibration in a first object having a first surface and a second surface when a second object touches the first object, the detection being performed by a sensor held at a portion of the first object which is different from a portion where the second object touches, in a state where the vibration in the first object is transmitted; and
a circuitry configured to identify a touch position where the second object touches the first object by comparing a vibration characteristic of the vibration datum and a vibration characteristic for each position of the first object where the second object touches,
wherein the circuitry configured to identify the touch position identifies when the touch position is on the first surface of the first object, and
wherein the circuitry configured to identify the touch position identifies when the touch position is on the second surface of the first object.

8. The analyzing device according to claim 7,
wherein the circuitry configured to receive the vibration datum receives the vibration datum obtained by the detection of, performed by the sensor, the change in the vibration state in the first object, which is generated by a touch of the second object to the first object which vibrates with a predetermined vibration pattern.

9. The analyzing device according to claim 7, further comprising:
a circuitry configured to store a vibration characteristic for each position in a position group set in a portion of the first object where the second object touches,
wherein the circuitry configured to identify the touch position identifies the touch position as one or a plurality of positions in the position group.

10. The analyzing device according to claim 9,
wherein the circuitry configured to store the vibration characteristic for each position stores a command corresponding to a pattern of combination of predetermined positions in the position group, and
wherein the circuitry configured to identify the touch position specifies the command corresponding to the pattern including the identified touch position.

11. The analyzing device according to claim 9,
wherein the circuitry configured to store the vibration characteristic for each position stores a command corresponding to at least a part of the position in the position group, and
wherein the circuitry configured to identify the touch position specifies the command corresponding to the identified touch position.

12. The analyzing device according to claim 11,
wherein the circuitry configured to receive the vibration datum transmits the specified command to an external device.

13. The analyzing device according to claim 7,
wherein the circuitry configured to receive the vibration datum receives the vibration datum obtained by detection of performed by the sensor, the vibration generated in the first object when the second object touches the first object.

14. The analyzing device according to claim 13,
wherein the first object is a striking tool, and
wherein the second object is a hit object which touches the striking tool.

15. The analyzing device according to claim 14,
wherein the sensor is mounted on either the first surface or the second surface of the striking tool.

16. The analyzing device according to claim 14,
wherein the sensor is mounted on either a left side or a right side of the striking tool which has a laterally symmetrical shape, and
wherein the circuitry configured to identify the touch position identifies whether the touch position was on the left side or the right side of the striking tool.

17. The analyzing device according to claim 14, further comprising:
an output device for presenting information related to the touch position to a user.

18. The analyzing device according to claim 17,
wherein the output device presents a list which shows positions in an order of a highest probability that a position is the touch position to the user.

19. The analyzing device according to claim 10,
wherein the output device presents a map which shows the touch position to the user.

20. A recording medium having a program recorded thereon, the program causing a computer to execute:
a function of receiving a vibration datum obtained by detection of a change in a state of a vibration in a first object having a first surface and a second surface when a second object touches the first object, the detection being performed by a sensor held at a portion of the first object which is different from a portion where the second object touches, in a state where the vibration in the first object is transmitted; and
a function of identifying a touch position where the second object touches the first object, the touch position being on the first surface and the second surface of the first object, by comparing a vibration characteristic of the vibration datum and a vibration characteristic for each position of the first object where the second object touches.

* * * * *